US012763478B2

(12) United States Patent
Go et al.

(10) Patent No.: US 12,763,478 B2
(45) Date of Patent: Oct. 13, 2026

(54) ELECTRONIC DEVICE FOR PERFORMING ANTENNA TUNING AND METHOD OF OPERATING THE SAME

(71) Applicant: Samsung Electronics Co., Ltd., Suwon-si (KR)

(72) Inventors: Hyunsung Go, Suwon-si (KR); Myungjin Kang, Suwon-si (KR); Youngjun Park, Suwon-si (KR); Hyungjoon Yu, Suwon-si (KR); Youngkwon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 329 days.

(21) Appl. No.: 18/400,658

(22) Filed: Dec. 29, 2023

(65) Prior Publication Data

US 2024/0222875 A1 Jul. 4, 2024

Related U.S. Application Data

(63) Continuation of application No. PCT/KR2023/021994, filed on Dec. 29, 2023.

(30) Foreign Application Priority Data

Dec. 30, 2022 (KR) ........................ 10-2022-0190206
Jan. 31, 2023 (KR) ........................ 10-2023-0013317
Feb. 3, 2023 (KR) ........................ 10-2023-0015182

(51) Int. Cl.
*H01Q 13/10* (2006.01)
*H04B 17/318* (2015.01)

(52) U.S. Cl.
CPC ......... *H01Q 13/103* (2013.01); *H04B 17/318* (2015.01)

(58) Field of Classification Search
CPC ..... H04B 17/318; H01Q 13/10; H01Q 13/103
See application file for complete search history.

(56) References Cited

U.S. PATENT DOCUMENTS 11,218,181 B2 * 1/2022 Yu ........................ H04B 1/0064
11,399,306 B1 7/2022 Marupaduga
(Continued)

FOREIGN PATENT DOCUMENTS

KR 10-2012-0086300 8/2012
KR 10-2015-0099134 8/2015
(Continued)

OTHER PUBLICATIONS

Search Report and Written Opinion dated Apr. 24, 2024 issued in International Patent Application No. PCT/KR2023/021994.
(Continued)

*Primary Examiner* — Tuan H Nguyen
(74) *Attorney, Agent, or Firm* — Nixon & Vanderhye, P.C.

(57) ABSTRACT

According to an embodiment, an electronic device may include memory storing instructions, a plurality of antennas including a first antenna configured to transmit and receive radio frequency (RF) signals corresponding to a first radio access technology (RAT) and a second RAT, and a second antenna configured to receive RF signals corresponding to the first RAT and the second RAT, an RF circuit coupled to the plurality of antennas, and at least one communication processor, comprising processing circuitry, operatively coupled to the memory and the RF circuit. The instructions, when executed by at least one communication processor, individually and/or collectively, may cause the electronic device to: establish a first transmission channel connection based on the first RAT and a second transmission channel connection based on the second RAT using one of the plurality of antennas, identify whether a voice call based on
(Continued)

the first RAT is executed, and operate in a first antenna tuning mode, based on an electric field based on the first RAT being equal to or greater than a first value, and operate in a second antenna tuning mode, based on the electric field based on the first RAT being less than the first value, during execution of the voice call. Based on the first antenna tuning mode being switched to the second antenna tuning mode according to a change in the electric field, a parameter associated with antenna sensitivity of the second transmission channel connection based on the second RAT may decrease.

20 Claims, 19 Drawing Sheets

(56) References Cited

U.S. PATENT DOCUMENTS

| | | | | |
|---|---|---|---|---|
| 11,596,015 | B2 * | 2/2023 | Gopal | H04B 7/082 |
| 2011/0096815 | A1 | 4/2011 | Shin et al. | |
| 2014/0273884 | A1 | 9/2014 | Mantravadi et al. | |
| 2017/0280503 | A1 | 9/2017 | He et al. | |
| 2019/0268954 | A1 | 8/2019 | Yu et al. | |
| 2019/0296789 | A1 | 9/2019 | Yu et al. | |
| 2020/0099409 | A1 | 3/2020 | Nguyen et al. | |
| 2020/0177226 | A1 | 6/2020 | Cha et al. | |
| 2020/0244292 | A1 | 7/2020 | Park et al. | |
| 2020/0280827 | A1 | 9/2020 | Fechtel et al. | |
| 2021/0408984 | A1 | 12/2021 | Arkiszewski et al. | |
| 2022/0070953 | A1 | 3/2022 | Gopal et al. | |
| 2022/0225412 | A1 | 7/2022 | Tooher et al. | |
| 2022/0368438 | A1 | 11/2022 | Yang et al. | |
| 2022/0408517 | A1 | 12/2022 | Bae et al. | |

FOREIGN PATENT DOCUMENTS

| | | | |
|---|---|---|---|
| KR | 10-2015-0129306 | | 11/2015 |
| KR | 10-2020-0015508 | | 2/2020 |
| KR | 10-2130914 | | 8/2020 |
| KR | 10-2022-0001480 | | 1/2022 |
| KR | 10-2022-0037276 | | 3/2022 |
| KR | 20220134904 | A | 10/2022 |
| KR | 10-2022-0147418 | | 11/2022 |
| KR | 10-2022-0168483 | | 12/2022 |
| WO | 2021185280 | A1 | 9/2021 |

OTHER PUBLICATIONS

Extended European Search Report dated Feb. 10, 2026 in European Application No. 23913028.9.

* cited by examiner

ELECTRONIC DEVICE FOR PERFORMING ANTENNA TUNING AND METHOD OF OPERATING THE SAME

CROSS-REFERENCE TO RELATED APPLICATIONS

This application is a continuation of International Application No. PCT/KR2023/021994 designating the United States, filed on Dec. 29, 2023, in the Korean Intellectual Property Receiving Office and claiming priority to Korean Patent Application Nos. 10-2022-0190206, filed on Dec. 30, 2022, 10-2023-0013317, filed on Jan. 31, 2023, and 10-2023-0015182, filed on Feb. 3, 2023, in the Korean Intellectual Property Office, the disclosures of each of which are incorporated by reference herein in their entireties.

BACKGROUND

Field

The disclosure relates to an electronic device for performing antenna tuning and a method thereof.

Description of Related Art

Owing to the development of wireless communication systems, voice call services may be provided over a network. For example, voice over long term evolution (VOLTE) may provide voice call services over a high-speed data communication packet network, LTE just like over a traditional circuit network. Compared to traditional circuit calls, VOLTE may provide a faster connection speed and significantly improved call quality, while guaranteeing quality by communication carriers in the same manner as mobile VoIP (mVoIP) calls.

As the recent development of mobile communication technology has led to the widespread use of mobile devices equipped with various functions, efforts are being made to develop 5th generation (5G) communication systems to meet the growing demand for wireless data traffic. To achieve high data rates, implementation of 5G communication systems in an ultra-high frequency band in addition to the high frequency bands used in $3^{rd}$ generation (3G) and LTE is under consideration.

For example, beamforming, massive multiple input multiple output (massive MIMO), full dimensional MIMO (FD-MIMO), array antenna, analog beamforming, and large-scale antenna techniques are being discussed for the 5G communication systems to mitigate the path loss of radio waves in the mmWave band and increase the propagation distance of radio waves.

To transmit a signal to a communications network (e.g., a base station (BS)), an electronic device may transmit data generated by a processor or a communication processor inside it to the outside through at least one antenna after signal processing of the data through a radio frequency integrated circuit (RFIC) and a radio frequency front end (RFFE) circuit.

As a way to implement 5G communication, stand alone (SA) and non-stand alone (NSA) schemes are considered. The NSA scheme may include E-UTRA NR dual connectivity (EN-DC) in which a new radio (NR) system is used in conjunction with a legacy LTE system. In the NSA scheme, a user equipment (UE) may use a next generation Node B (gNB) of the NR system as well as an evolved Node B (eNB) of the LTE system. A technology that enables a UE to use heterogeneous communication systems may be called dual connectivity.

Dual connectivity was first proposed by $3^{rd}$ generation partnership project (3GPP) release-12. Dual connectivity using a 3.5 GHz frequency band as a small cell in addition to the LTE system was initially proposed. Implementing EN-DC using the dual connectivity proposed by 3GPP release-12 such that LTE network communication is used through a master node (MN) and NR network communication is used through a secondary node (SN) is under discussion.

A UE may receive, from an MN, a message (e.g., a radio resource control (RRC) connection reconfiguration message) instructing the UE to report at least one parameter corresponding to a neighbor cell. For example, the at least one parameter may be a reference signal received power (RSRP) or signal to interference & noise ratio (SINR). The at least one parameter corresponding to the neighbor cell is not limited to the above examples. The UE may measure the at least one parameter of a signal from a BS in the neighbor cell and report the parameter to the MN. The MN may determine to add a specific BS as an SN and command the UE to add a secondary cell group (SCG). The UE may transmit and receive data to and from a network based on communications with two networks. A UE supporting EN-DC may support LTE and 5G communication simultaneously. For example, the UE may transmit and receive control-plane data and user-plane data through LTE communication, and transmit and receive user-plane data through 5G communication.

Dynamic spectrum sharing (DSS) is a technology that allows both LTE and NR to be deployed in the same frequency band. A UE supporting LTE and a UE supporting NR may communicate with their respective networks in the same frequency band or through the same channel, based on DSS.

SUMMARY

According to an example embodiment, an electronic device including a plurality of antennas including: memory storing instructions, a first antenna configured to transmit and receive radio frequency (RF) signals corresponding to a first radio access technology (RAT) and a second RAT, and a second antenna configured to receive RF signals corresponding to the first RAT and the second RAT, a radio frequency (RF) circuit coupled to the plurality of antennas, and at least one communication processor comprising processing circuitry operatively coupled to the memory and the RF circuit. The instructions, that when executed by at least one communication processor, individually and/or collectively, are configured to: cause the electronic device to establish a first transmission channel connection based on the first RAT and a second transmission channel connection based on the second RAT using one of the plurality of antennas; cause the electronic device to identify whether a voice call based on the first RAT is executed; cause the electronic device to operate in a first antenna tuning mode, based on an electric field based on the first RAT being equal to or greater than a first value, and operate in a second antenna tuning mode, based on the electric field based on the first RAT being less than the first value, during execution of the voice call. Based on the first antenna tuning mode being switched to the second antenna tuning mode according to a change in the electric field, a parameter associated with antenna sensitivity of the second transmission channel connection based on the second RAT decreases.

According to an example embodiment, a method of operating an electronic device includes: establishing a first transmission channel connection based on a first RAT and a second transmission channel connection based on a second RAT using one of a plurality of antennas of the electronic device including a first antenna configured to transmit and receive RF signals corresponding to the first RAT and the second RAT, and a second antenna configured to receive RF signals corresponding to the first RAT and the second RAT; identifying whether a voice call based on the first RAT is executed; operating in a first antenna tuning mode, based on an electric field based on the first RAT being equal to or greater than a first value, and operating in a second antenna tuning mode, based on the electric field based on the first RAT being less than the first value, during execution of the voice call. Based on the first antenna tuning mode being switched to the second antenna tuning mode according to a change in the electric field, a parameter associated with antenna sensitivity of the second transmission channel connection based on the second RAT decreases.

According to an example embodiment, a non-transitory computer-readable storage medium stores at least one instruction which when executed by at least one processor of an electronic device, causes the electronic device to perform at least one operation. The at least one operation includes: establishing a first transmission channel connection based on a first RAT and a second transmission channel connection based on a second RAT using one of a plurality of antennas of the electronic device including a first antenna configured to transmit and receive RF signals corresponding to the first RAT and the second RAT, and a second antenna configured to receive RF signals corresponding to the first RAT and the second RAT; identifying whether a voice call based on the first RAT is executed; operating in a first antenna tuning mode, based on an electric field based on the first RAT being equal to or greater than a first value, and operating in a second antenna tuning mode, based on the electric field based on the first RAT being less than the first value, during execution of the voice call. Based on the first antenna tuning mode being switched to the second antenna tuning mode according to a change in the electric field, a parameter associated with antenna sensitivity of the second transmission channel connection based on the second RAT decreases.

According to an example embodiment, an electronic device includes: memory storing instructions, a plurality of antennas including a first antenna configured to transmit and receive RF signals corresponding to a first RAT and a second RAT, and a second antenna configured to receive RF signals corresponding to the first RAT and the second RAT, an RF circuit coupled to the plurality of antennas, and at least one communication processor comprising processing circuitry operatively coupled to the memory and the RF circuit. The instructions, that when executed by at least one communication processor, individually and/or collectively, are configured to: cause the electronic device to establish a first connection based on the first RAT and a second connection based on the second RAT; cause the electronic device to identify whether a voice call based on the first RAT is executed; cause the electronic device to identify at least one parameter associated with the first antenna, when identifying that the voice call is executed; cause the electronic device to control the RF circuit to use a first antenna tuning mode in which the first antenna is tuned to the first RAT and the second RAT, based on the at least one parameter not satisfying a condition associated with quality of the voice call; and cause the electronic device to control the RF circuit to use a second antenna tuning mode in which the first antenna is tuned to the first RAT, based on the at least one parameter satisfying the condition associated with the quality of the voice call.

According to an example embodiment, a method of operating an electronic device includes: establishing a first connection based on a first RAT and a second connection based on a second RAT; identifying whether a voice call based on the first RAT is executed; based on identifying that the voice call is executed, identifying at least one parameter associated with a first antenna configured to transmit and receive RF signals corresponding to the first RAT and the second RAT among a plurality of antennas of the electronic device including the first antenna and a second antenna configured to receive RF signals corresponding to the first RAT and the second RAT; controlling an RF circuit of the electronic device to use a first antenna tuning mode in which the first antenna is tuned to the first RAT and the second RAT, based on the at least one parameter not satisfying a condition associated with quality of the voice call; and controlling the RF circuit to use a second antenna tuning mode in which the first antenna is tuned to the first RAT, based on the at least one parameter satisfying the condition associated with the quality of the voice call.

According to an example embodiment, a non-transitory computer-readable storage medium stores at least one instruction which when executed by at least one processor of an electronic device, causes the electronic device to perform at least one operation. The at least one operation includes: establishing a first connection based on a first RAT and a second connection based on a second RAT; identifying whether a voice call based on the first RAT is executed; based on identifying that the voice call is executed, identifying at least one parameter associated with a first antenna configured to transmit and receive RF signals corresponding to the first RAT and the second RAT among a plurality of antennas of the electronic device including the first antenna and a second antenna configured to receive RF signals corresponding to the first RAT and the second RAT; controlling an RF circuit of the electronic device to use a first antenna tuning mode in which the first antenna is tuned to the first RAT and the second RAT, based on the at least one parameter not satisfying a condition associated with quality of the voice call; and controlling the RF circuit to use a second antenna tuning mode in which the first antenna is tuned to the first RAT, based on the at least one parameter satisfying the condition associated with the quality of the voice call.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
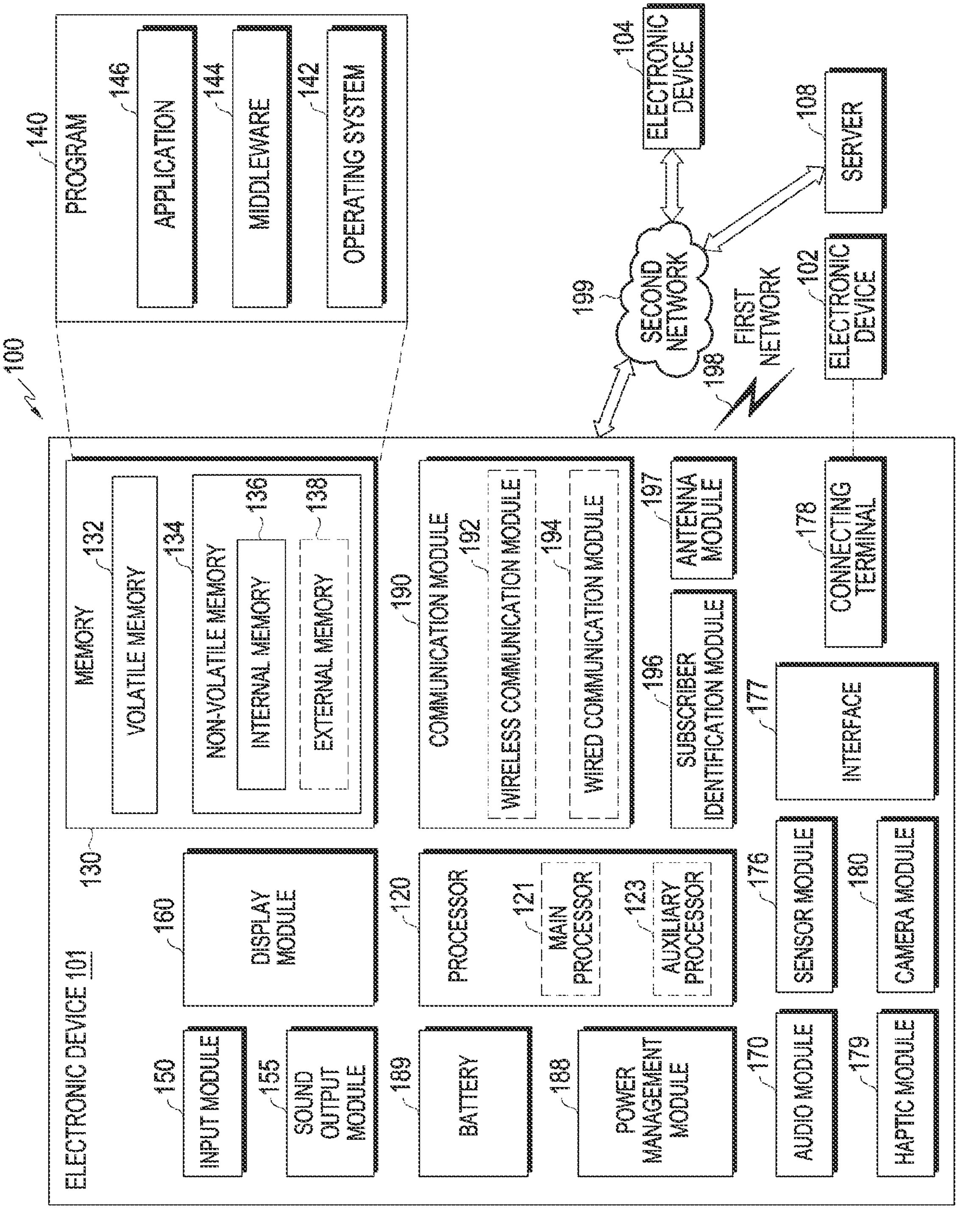
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 through a first network 198 (e.g., a short-range wireless communication network), or at least one of an electronic device 104 or a server 108 through a second network 199 (e.g., a long-range wireless communication network). According to an embodiment, the electronic device 101 may communicate with the electronic device 104 through the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or through a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound through the input module 150, or output the sound through the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector through which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user through his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device through the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device through the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween through an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 through the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
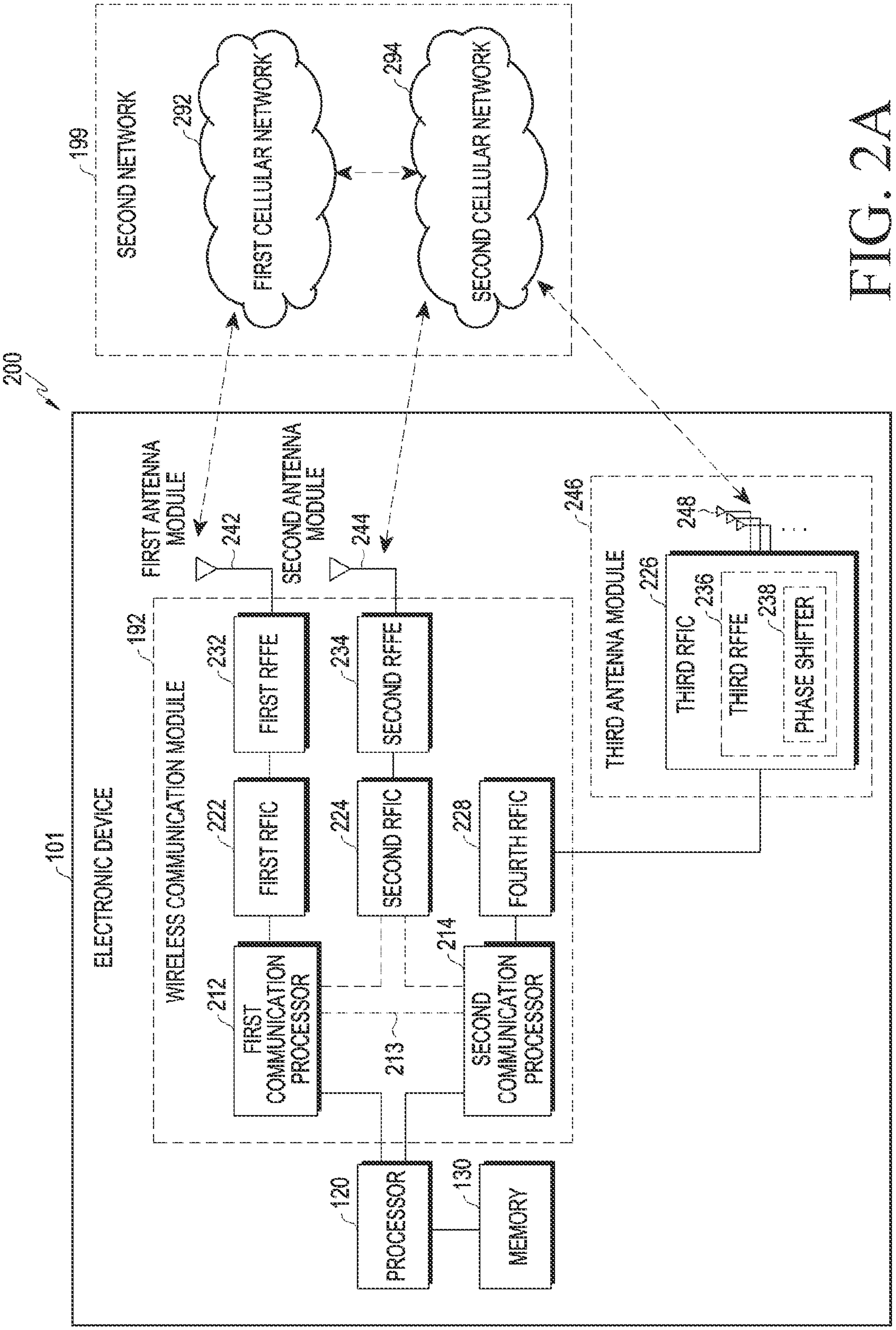
FIG. 2A is a block diagram illustrating an example configuration of an electronic device for supporting legacy network communication and 5th generation (5G) network communication according to various embodiments.

FIG. 2A is a block diagram illustrating an example configuration of an electronic device for supporting legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include the processor 120 and the memory 130. The memory 130 may store instructions. The instructions, that when executed by at least one processor, e.g. application processor and/or communication processor, may cause the electronic device 101 to perform at least one operation. The second network 199 may include a first cellular network 292 and a second cellular network 294. According to an embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to an embodiment, the fourth RFIC 228 may be omitted or included as a part of the third RFIC 226.

The first communication processor 212 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The communication processor 212 may support establishment of a communication channel in a band to be used for wireless communication with the first cellular network 292 and legacy network communication through the established communication channel. According to embodiments, the first cellular network may be a legacy network including a $2^{nd}$ generation (2G), $3^{rd}$ generation (3G), $4^{th}$ generation (4G), or long term evolution (LTE) network. The second communication processor 214 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The second communication processor 214 may support establishment of a communication channel corresponding to a specified band (e.g., about 6 GHz to about 60 GHz) of a band to be used for wireless communication with the second cellular network 294 and 5G network communication through the established communication channel. According to embodiments, the second cellular network 294 may be a 5G network as defined by the $3^{rd}$ generation partnership project (3GPP). Further, according to an embodiment, the first communication processor 212 or the second communication processor 214 may support establishment of a communication channel corresponding to another specified band (e.g., below about 6 GHz) of the band to be used for wireless communication with the second cellular network 294 and 5G network communication through the established communication channel.

The first communication processor 212 may transmit and receive data to and from the second communication processor 214. For example, data classified to be transmitted over the second cellular network 294 may be changed as data classified to be transmitted over the first cellular network 292. In this case, the first communication processor 212 may receive transmission data from the second communication processor 214. For example, the first communication processor 212 may transmit and receive data to and from the second communication processor 214 through an inter-processor interface 213. The inter-processor interface 213 may be implemented, for example, as, but not limited to, a universal asynchronous receiver/transmitter (UART) (e.g., high speed-UART (HS-UART)) or peripheral component interconnect bus express (PCIe) interface. Alternatively, the first communication processor 212 and the second communication processor 214 may exchange control information and packet data information, for example, using shared memory. The first communication processor 212 may transmit and receive various pieces of information, such as sensing information, information about an output strength, and resource block (RB) allocation information, to and from the second communication processor 214.

Depending on implementation, the first communication processor 212 may not be directly connected to the second communication processor 214. In this case, the first communication processor 212 may transmit and receive data to and from the second communication processor 214 through the processor 120 (e.g., an application processor). For example, the first communication processor 212 and the second communication processor 214 may communicate with the processor 120 (e.g., the application processor) through an HS-UART interface or a PCIe interface. However, the type of the interface is not limited. Alternatively, the first communication processor 212 and the second communication processor 214 may exchange control information and packet data information with the processor 120 (e.g., the application processor), using shared memory.

Figure 2B:
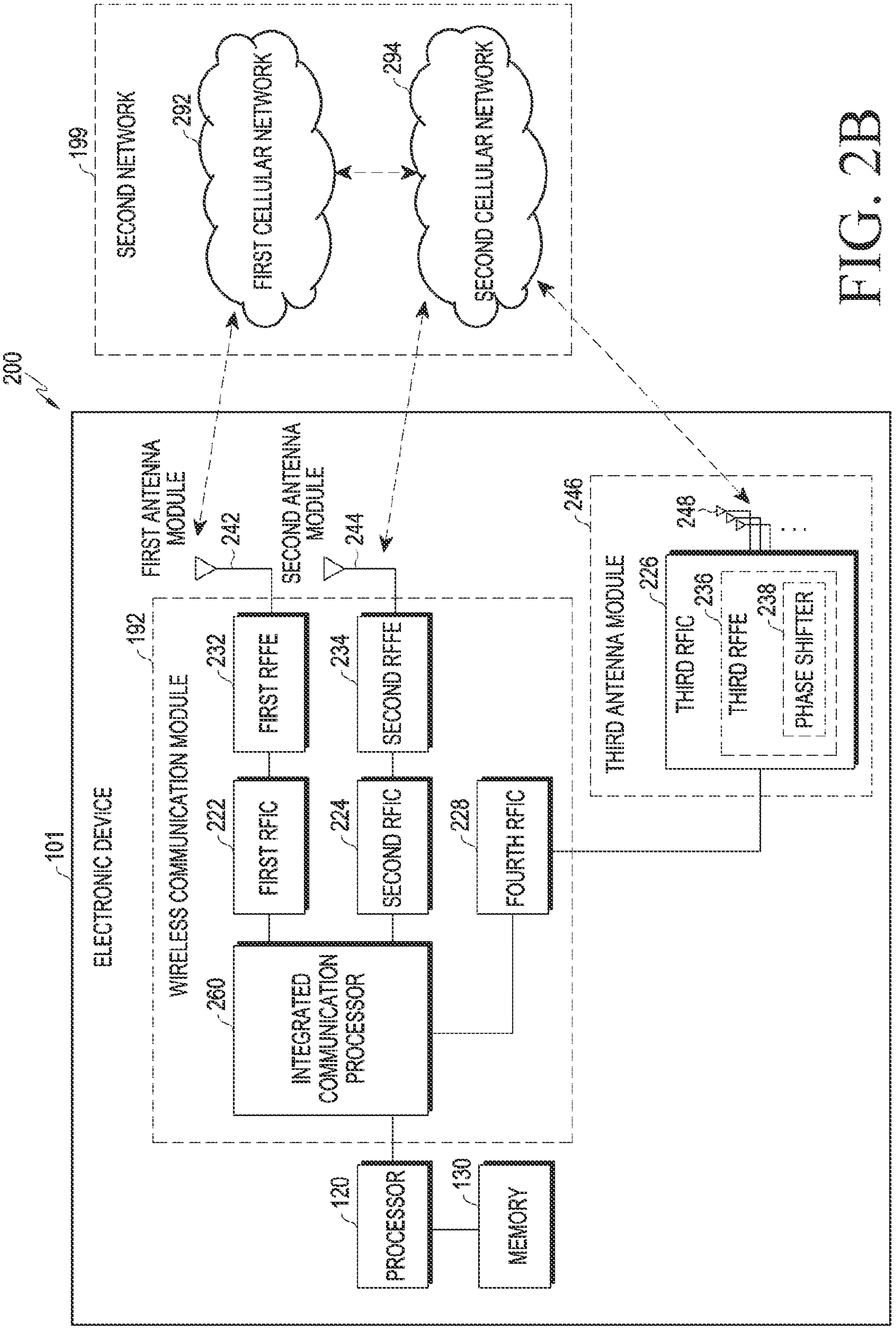
FIG. 2B is a block diagram illustrating an example configuration of an electronic device for supporting legacy network communication and 5G network communication according to various embodiments.

According to an embodiment, the first communication processor 212 and the second communication processor 214 may be implemented on a single chip or within a single package. According to embodiments, the first communication processor 212 or the second communication processor 214 may be formed together with the processor 120, the auxiliary processor 123, or the communication module 190 on a single chip or within a single package. For example, as illustrated in FIG. 2B, an integrated communication processor 260 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s)

performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The integrated communication processor 260 may support all functions for communicating with both the first cellular network 292 and the second cellular network 294.

During transmission, the first RFIC 222 may convert a baseband signal generated by the first communication processor 212 into an RF signal at about 700 MHz to about 3 GHz used in the first cellular network 292 (e.g., a legacy network). During reception, an RF signal may be obtained from the first network 292 (e.g., the legacy network) through an antenna (e.g., the first antenna module 242) and preprocessed through an RFFE (e.g., the first RFFE 232). The first RFIC 222 may convert the preprocessed RF signal into a baseband signal for processing in the first communication processor 212.

During transmission, the second RFIC 224 may convert a baseband signal generated by the first communication processor 212 or the second communication processor 214 into an RF signal in a Sub6 band (e.g., below about 6 GHZ) (hereinafter, referred to as a 5G Sub6 RF signal) used in the second cellular network 294 (e.g., a 5G network). During reception, a 5G Sub6 RF signal may be obtained from the second cellular network 294 (e.g., the 5G network) through an antenna (e.g., the second antenna module 244) and preprocessed through an RFFE (e.g., the second RFFE 234). The second RFIC 224 may convert the preprocessed 5G Sub6 RF signal into a baseband signal for processing in a corresponding one of the first communication processor 212 and the second communication processor 214.

The third RFIC 226 may convert a baseband signal generated by the second communication processor 214 into an RF signal in a 5G Above6 band (e.g., about 6 GHz to about 60 GHz) (hereinafter, referred to as a 5G Above6 RF signal), for use in the second cellular network 294 (e.g., the 5G network). During reception, a 5G Above6 RF signal may be obtained from the second cellular network 294 (e.g., the 5G network) through an antenna (e.g., the antennas 248) and preprocessed through the third RFFE 236. The third RFIC 226 may convert the preprocessed 5G Above6 RF signal into a baseband signal for processing in the second communication processor 214. In an embodiment, the third RFFE 236 may be formed as a part of the third RFIC 226.

According to an embodiment, the electronic device 101 may include the fourth RFIC 228 separately from or at least as a part of the third RFIC 226. In this case, the fourth RFIC 228 may convert a baseband signal generated by the second communication processor 214 into an RF signal in an intermediate frequency band (e.g., about 9 GHz to about 11 GHz) (hereinafter, referred to as an intermediate frequency (IF) signal) and then transmit the IF signal to the third RFIC 226. The third RFIC 226 may convert the IF signal into a 5G Above6 RF signal. During reception, a 5G Above6 RF signal may be received from the second cellular network 294 (e.g., the 5G network) through an antenna (e.g., the antennas 248) and converted into an IF signal by the third RFIC 226. The fourth RFIC 228 may convert the IF signal into a baseband signal for processing in the second communication processor 214.

According to an embodiment, the first RFIC 222 and the second RFIC 224 may be implemented as at least a part of a single chip or single package. According to an embodiment, when the first RFIC 222 and the second RFIC 224 in FIG. 2A or FIG. 2B are implemented on a single chip or in a single package, they may be implemented as an integrated RFIC. In this case, the integrated RFIC may be connected to the first RFFE 232 and the second RFFE 234, convert a baseband signal into a signal in a band supported by the first RFFE 232 and/or the second RFFE 234, and transmit the converted signal to one of the first RFFE 232 and the second RFFE 234. According to an embodiment, the first RFFE 232 and the second RFFE 234 may be implemented as at least a part of a single chip or a single package. According to an embodiment, at least one of the first antenna module 242 or the second antenna module 244 may be omitted or combined with another antenna module to process RF signals in a corresponding plurality of bands.

According to an embodiment, the third RFIC 226 and the antennas 248 may be disposed on the same substrate to form the third antenna module 246. For example, the wireless communication module 192 or the processor 120 may be disposed on a first substrate (e.g., a main PCB). In this case, the third RFIC 226 may be disposed in a partial area (e.g., on the bottom surface) of a second substrate (e.g., a sub PCB) separate from the first substrate, and the antennas 248 may be disposed on another partial area (e.g., on the top surface) of the second substrate, thereby forming the third antenna module 246. It is possible to reduce the lengths of transmission lines between the third RFIC 226 and the antennas 248 by placing them on the same substrate. This may reduce, for example, the loss (e.g., attenuation) of signals in a high frequency band (e.g., about 6 GHz to about 60 GHz) used for 5G network communication, caused by the transmission lines. Accordingly, the electronic device 101 may improve the quality or speed of communication with the second network 294 (e.g., the 5G network).

According to an embodiment, the antennas 248 may be formed as an antenna array including a plurality of antenna elements that may be used for beamforming. In this case, the third RFIC 226 may include, for example, a plurality of phase shifters 238 corresponding to the plurality of antenna elements, as a part of the third RFFE 236. During transmission, each of the plurality of phase shifters 238 may change the phase of a 5G Above6 RF signal to be transmitted to the outside of the electronic device 101 (e.g., to a BS in the 5G network) through a corresponding antenna element. During reception, each of the plurality of phase shifters 238 may convert the phase of a 5G Above6 RF signal received from the outside through a corresponding antenna element to the same or substantially the same phase. This enables transmission or reception through beamforming between the electronic device 101 and the outside.

The second cellular network 294 (e.g., the 5G network) may operate independently of the first cellular network 292 (e.g., the legacy network) (e.g., SA) or may operate in conjunction with the first cellular network 292 (e.g., NSA). For example, the 5G network may only have an access network (e.g., a 5G radio access network (RAN) or a next generation RAN (NG RAN)) without a core network (e.g., a next generation core (NGC)). In this case, the electronic device 101 may access the access network of the 5G network and then access an external network (e.g., the Internet) under the control of a core network (e.g., an evolved packet core (EPC)) of the legacy network. Protocol information (e.g., LTE protocol information) for communication with the legacy network or protocol information (e.g., NR protocol information) for communication with the 5G network may be stored in the memory 230 and accessed by other components (e.g., the processor 120, the first communication processor 212, or the second communication processor 214).

Figure 3A:
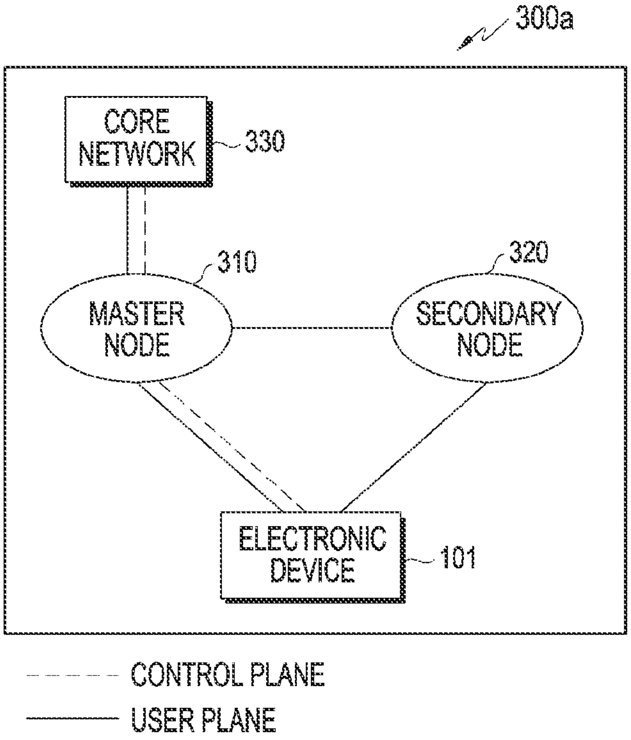
FIG. 3A is a diagram illustrating a wireless communication system for providing a network of legacy communication and/or 5G communication according to various embodiments.
Figure 3B:
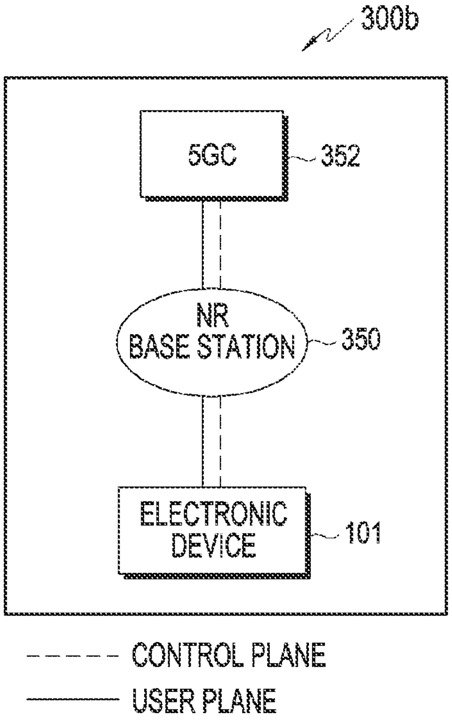
FIG. 3B is a diagram illustrating a wireless communication system for providing a network of legacy communication and/or 5G communication according to various embodiments.
Figure 3C:
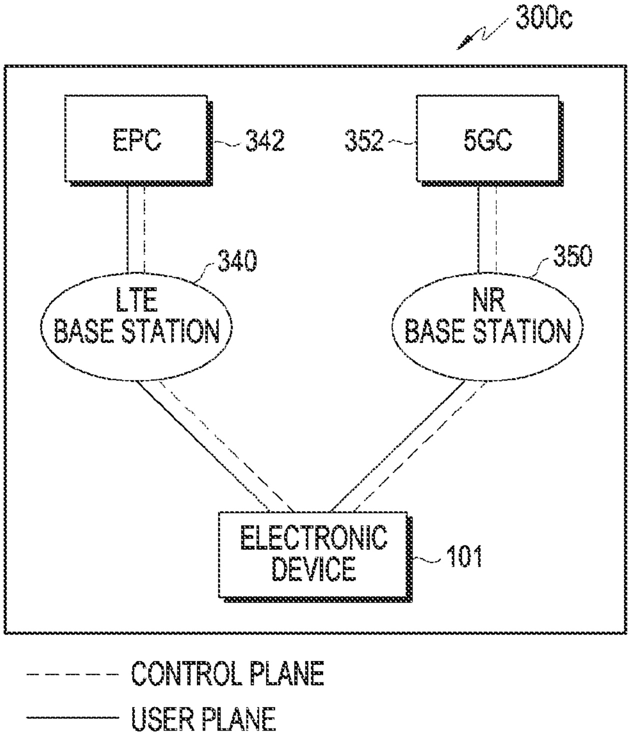
FIG. 3C is a diagram illustrating a wireless communication system for providing a network of legacy communication and/or 5G communication according to various embodiments.

FIGS. 3A, 3B, and 3C are diagrams illustrating various wireless communication systems for providing a network of legacy communication and/or 5G communication according to various embodiments. Referring to FIGS. 3A, 3B, and 3C, network environments 300*a*, 300*b*, and 300*c* may include at least one of a legacy network or a 5G network. The legacy network may include, for example, a 3GPP 4G or LTE BS 340 (e.g., an evolved Node B (eNB or eNode B)) supporting wireless access of the electronic device 101 and an EPC 342 managing 4G communication. The 5G network may include, for example, an NR BS 350 (e.g., a next generation Node B (gNB or gNodeB)) supporting wireless access of the electronic device 101 and a 5G core (5GC) 352 managing 5G communication of the electronic device 101.

According to an embodiment, the electronic device 101 may transmit and receive a control message and user data through legacy communication and/or 5G communication. The control message may include, for example, a message related to at least one of security control, bearer setup, authentication, registration, or mobility management of the electronic device 101. The user data may refer to, for example, user data other than control messages, transmitted or received between the electronic device 101 and a core network 330 (e.g., the EPC 342).

Referring to FIG. 3A, the electronic device 101 according to an embodiment may transmit and receive at least one of a control message or user data to and from at least a part (e.g., the NR BS 350 and the 5GC 352) of the 5G network, using at least a part (e.g., the LTE BS 340 and the EPC 342) of the legacy network.

According to an embodiment, the network environment 300*a* may include a network environment in which wireless communication dual connectivity (DC) to the LTE BS 340 and the NR BS 350 is provided, and a control message is transmitted and received to and from the electronic device 101 through the core network 230 which is one of the EPC 342 and the 5GC 352.

According to an embodiment, in the DC environment, one of the LTE BS 340 and the NR BS 350 may operate as an MN 310, and the other BS may operate as an SN 320. The MN 310 may be connected to the core network 230, and transmit and receive a control message. The MN 310 and the SN 320 may be connected to each other through a network interface and transmit and receive a message related to management of radio resources (e.g., a communication channel) to and from each other.

According to an embodiment, the MN 310 may include the LTE BS 340, the SN 320 may include the NR BS 350, and the core network 330 may include the EPC 342. For example, control messages may be transmitted and received through the LTE BS 340 and the EPC 342, and user data may be transmitted and received through at least one of the LTE BS 340 or the NR BS 350.

According to an embodiment, the MN 310 may include the NR BS 350, the SN 320 may include the LTE BS 340, and the core network 330 may include the 5GC 352. For example, control messages may be transmitted and received through the NR BS 350 and the 5GC 352, and user data may be transmitted and received through at least one of the LTE BS 340 or the NR BS 350.

Referring to FIG. 3B, according to an embodiment, the 5G network may include the NR BS 350 and the 5GC 352 and independently transmit and receive control messages and user data to and from the electronic device 101.

Referring to FIG. 3C, each of the legacy network and the 5G network according to an embodiment may provide data transmission and reception independently. For example, the electronic device 101 and the EPC 342 may transmit and receive control messages and user data through the LTE BS 340. For example, the electronic device 101 and the 5GC 352 may also transmit and receive control messages and user data through the NR BS 350.

According to an embodiment, the electronic device 101 may be registered to at least one of the EPC 342 or the 5GC 352 to transmit and receive control messages.

According to an embodiment, the EPC 342 or the 5GC 352 may interwork to manage communication of the electronic device 101. For example, information about movement of the electronic device 101 may be transmitted and received through an interface between the EPC 342 and the 5GC 352.

As described above, dual connectivity through the LTE BS 340 and the NR BS 350 may be referred to as E-UTRA new radio dual connectivity (EN-DC). Dual connectivity through the NR BS 350 and the LTE BS 340 may be referred to as new radio E-UTRA dual connectivity (NE-DC). Multi-radio dual connectivity (MR DC) may find its various applications in addition to EN-DC. For example, both a first network and a second network of MR DC may be related to LTE communication, where the second network may be a network corresponding to a small cell in a specific frequency. For example, both the first network and the second network of MR DC may be related to 5G, where the first network may correspond to a frequency band below 6 GHz (e.g., below 6) and the second network may correspond to a frequency band at or above 6 GHz (e.g., over 6). Those skilled in the art will readily understand that in addition to the above examples, any network structure is applicable to an embodiment of the disclosure as far as dual connectivity is applicable to the network structure.

Figure 4:
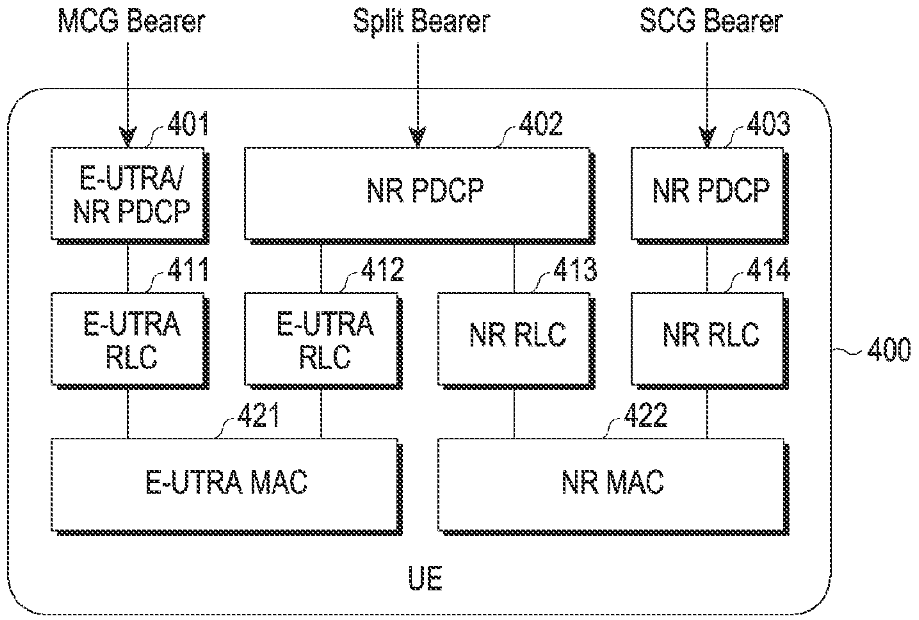
FIG. 4 is a diagram illustrating bearers at a user equipment (UE) according to various embodiments.

FIG. 4 is a diagram illustrating example bearers in a user equipment (UE) according to various embodiments.

Bearers available in a 5G NSA environment (e.g., the network environment 300*a* of FIG. 3A) may include a master cell group (MCG) bearer, a secondary cell group (SCG) bearer, and a split bearer. An E-UTRA/NR packet data convergence protocol (PDCP) entity 401 and NR PDCP entities 402 and 403 may be established in a UE 400. In the UE 400, E-UTRA radio link control (RLC) entities 411 and 412 and NR RLC entities 413 and 414 may be established. In the UE 400, an E-UTRA medium control access (MAC) entity 421 and an NR MAC entity 422 may be established. A UE may represent a user device capable of communicating with a BS and be interchangeably used with the electronic device 101 of FIG. 1. For example, in embodiments, when it is said that a UE performs a specific operation, this may refer, for example, to at least one element included in the electronic device 101 performing the specific operation.

An MCG may correspond to, for example, the MN 310 of FIG. 3A, and an SCG may correspond to, for example, the SN 320 of FIG. 3A. Once a node to communicate with is determined, the UE 400 may set up various entities illustrated in FIG. 4 to communicate with the determined node (e.g., a BS). The PDCP entities 401, 402, and 403 may receive data (e.g., PDCP service data units (SDUs) corresponding to Internet protocol (IP) packets) and output transformed data (e.g., PDCP protocol data units (PDUs)) reflecting additional information (e.g., header information). The RLC entities 411, 412, 413, and 414 may receive the transformed data (e.g., the PDCP PDUs) output from the PDCP layer entities 401, 402, and 403 and output transformed data (e.g., RLC PDUs) reflecting additional information (e.g., header information). The MAC entities 421 and 422 may receive the transformed data (e.g., RLC PDUs) output from the RLC entities 411, 412, 413, and 414 and output transformed data (e.g., MAC PDUs) reflecting additional information (e.g., header information) to the physical layer (not shown).

An MCG bearer may be associated with a path (or data) through which data may be transmitted and received using only resources or entities corresponding to an MN in dual connectivity. An SCG bearer may be associated with a path (or data) through which data may be transmitted and received using only resources or entities corresponding to an SN in dual connectivity. A split bearer may be associated with a path (or data) through which data may be transmitted and received using resources or entities corresponding to an MN and resources or entities corresponding to an SN in dual connectivity. Accordingly, as illustrated in FIG. 4, the split bearer may be associated with both the E-UTRA RLC entity 412 and the NR RLC entity 413 and both the E-UTRA MAC entity 421 and the NR MAC entity 422, through the NR PDCP entity 402.

Figure 5:
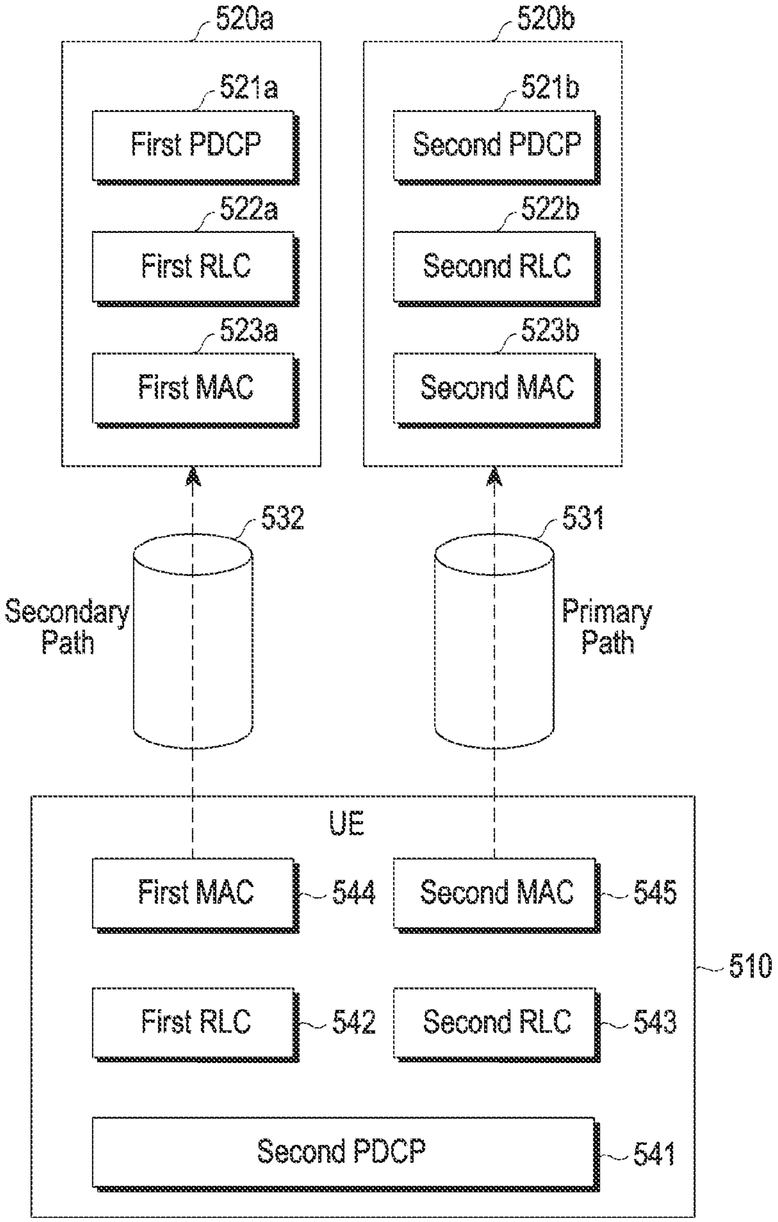
FIG. 5 is a diagram illustrating uplink paths between a UE and base stations (BSs) according to various embodiments.

FIG. 5 is a diagram illustrating uplink paths between a UE and BSs according to various embodiments.

In FIG. 5, a UE 510 (e.g., the electronic device 101) according to an embodiment may communicate with BSs 520*a* and 520*b* based on a split bearer. Accordingly, transmission data (e.g., IP packets) to be transmitted from the UE 510 to the BSs 520*a* and 520*b* may be transmitted to a second RLC entity 543 and a second MAC entity 545 or to a first RLC entity 542 and a first MAC entity 544 through a second PDCP entity 541. For example, the first RLC entity 542 and the first MAC entity 544 may be associated with a first network, and the second RLC entity 543 and the second MAC entity 545 may be associated with a second network. The first BS 520*a* may establish a first PDCP entity 521*a*, a first RLC entity 522*a*, and a first MAC entity 523*a*. The second BS 520*b* may establish a second PDCP entity 521*b*, a second RLC entity 522*b*, and a second MAC entity 523*b*. A path associated with the second RLC entity 543 and the second MAC entity 545 of the UE 510 may be a primary path 531, and a path associated with the first RLC entity 542 and the first MAC entity 514 may be a secondary path 532. The first PDCP entity 521*a* may be implemented identically to the second PDCP entity 521*b*. For example, for implementation of EN-DC, when the BS 520*a* is an LTE BS, the first PDCP entity 521*a* may be established as an NR PDCP entity. In an embodiment, a specific PDCP entity (e.g., an NR PDCP entity) may be located at the BS 520*a* or the BS 520*b*. When a split bearer is established, at least one of the first PDCP entity 521*a* or the second PDCP entity 521*b* may transmit data to a core network. In an embodiment, either the first PDCP entity 521*a* or the second PDCP entity 521*b* may not exist. The BS 520*a* and the BS 520*b* may communicate directly with each other.

The first network and the second network may be any networks, as far as they are capable of dual connectivity. For example, the first network and the second network may correspond to LTE communication and NR communication, respectively. For example, both the first network and the second network may be for LTE communication, with the second network corresponding to a small cell in a specific frequency. For example, both the first network and the second network may be for 5G, where the first network may correspond to a frequency band below 6 GHz (e.g., below 6) and the second network may correspond to a frequency band at or above 6 GHz (e.g., over 6).

The UE 510 according to an embodiment may transmit transmission data to the BSs 520*a* and 520*b* based on a split bearer, using at least one of the first network or the second network. The UE 510 according to an embodiment may set the second network associated with the second BS 520*b* corresponding to an SCG as the primary path 531 and the first network associated with the first BS 520*a* corresponding to an MCG as the secondary path 532. For example, the UE 510 may set the second network associated with the SCG as the primary path 531 based on information indicating the primary path received from an MN. The information indicating the primary path received from the MN may be included in an RRC message (e.g., an RRCReconfiguration message). In an embodiment, a method of setting a primary path by the UE is not limited. The primary path may be determined, for example, based on the policies of each communication carrier, and the UE 510 may identify the primary path by receiving information indicating the primary path. The primary path may represent a cell group identifier (ID) and a logical channel ID (LCID) of a primary RLC entity for uplink data transmission in case that a PDCP entity is associated with more than one RLC entity. The second PDCP entity 521*b* may be included in the BS 520*a* having the primary path. According to an embodiment, the first PDCP entity 521*a* may be included in the BS 520*b* having the secondary path.

The structure and operation of the electronic device 101 according to an embodiment will be described in greater detail below with reference to FIGS. 6, 7A, and 7B. While one communication processor 260 and one RFIC 610 are shown as connected to a plurality of RFFEs 631 and 632 in each of the drawings of embodiments described below, the embodiments are not limited thereto. In the following example embodiments, for example, a plurality of communication processors 212 and 214 and/or a plurality of RFICs 222, 224, 226, and 228 may be connected to the plurality of RFFEs 631 and 632, as illustrated in FIG. 2A or 2B.

Figure 6:
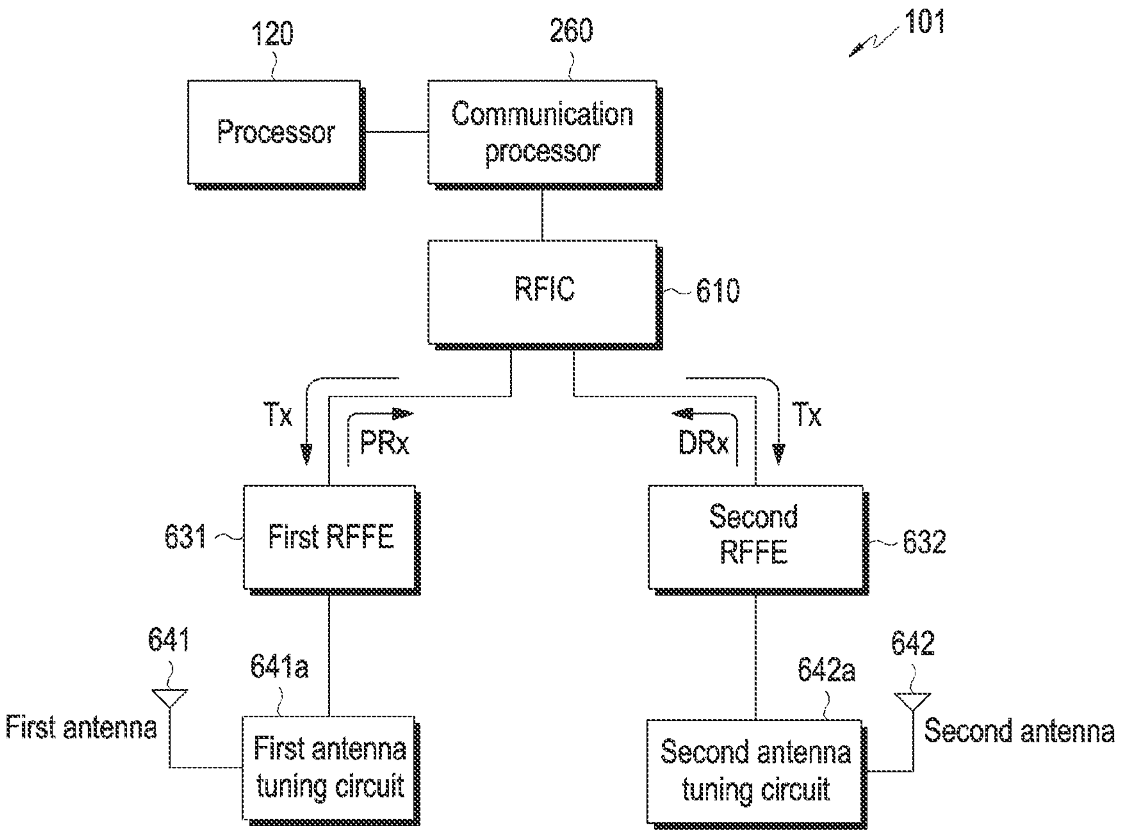
FIG. 6 is a block diagram illustrating an example configuration of an electronic device according to various embodiments.

FIG. 6 is a block diagram illustrating an example configuration of an electronic device according to various embodiments. According to an embodiment, FIG. 6 illustrates an embodiment in which the electronic device 101 includes two antennas 641 and 642. While FIG. 6 illustrates an electronic device including two antennas by way of example, the electronic device 101 may include three or more antennas according to an embodiment. For example, when the electronic device 101 operates in multiple input multiple output (MIMO), the electronic device 101 may receive a signal transmitted in MIMO from a BS through the plurality of antennas (e.g., two or more antennas).

Referring to FIG. 6, an electronic device (e.g., the electronic device 101 of FIG. 1) according to an embodiment may include the processor (e.g., including processing circuitry) 120, the communication processor (e.g., including processing circuitry) 260, the RFIC 610, the first RFFE 631, the second RFEE 632, the first antenna 641, the second antenna 642, a first antenna tuning circuit 641*a*, or a second antenna tuning circuit 642*a*. In an embodiment, the first RFFE 631 may be disposed in a first area within a housing of the electronic device 101, and the second RFFE 632 may be disposed in another area within the housing of the electronic device 101, spaced apart from the first area, which should not be construed as limiting the embodiment.

According to an embodiment, the RFIC 610 may convert a baseband signal generated by the communication processor 260 into an RF signal used in a communication network during transmission. For example, the RFIC 610 may transmit an RF signal used in a first communication network (e.g., a 5G network) or a second communication network (e.g., an LTE network) to the first antenna 641 through the first RFFE 631 and the first antenna tuning circuit 641*a*. The RFIC 610 may transmit an RF signal used for the first communication network (e.g., the 5G network) or the second communication network (e.g., the LTE network) to the second antenna 642 through the second RFFE 632 and the second antenna tuning circuit 642*a*.

In an embodiment, the first antenna 641 may be electrically connected to the first antenna tuning circuit 641*a*, and the second antenna 642 may be electrically connected to the second antenna tuning circuit 642*a*. In an embodiment, the communication processor 260 may adjust (e.g., tune) the characteristics of a signal (e.g., a transmission (Tx) signal) and a signal (e.g., a received (Rx) signal) transmitted and received through each of the connected antennas by adjusting a setting value of the first antenna tuning circuit 641*a* and a setting value of the second antenna tuning circuit 641*a*. Specific embodiments of this operation will be described in greater detail below with reference to FIGS. 7A and 7B.

According to an embodiment, the first antenna 641 may be set as a first Rx antenna, and the second antenna 642 may be set as a second Rx antenna. The electronic device 101 may receive a signal transmitted from a BS through the first antenna 641 and/or the second antenna 642 and decode the received signal. For example, the signal received through the first antenna 641 may be transmitted as a first Rx signal to the communication processor 260 through the first antenna tuning circuit 641*a*, the first RFFE 631, and the RFIC 610. In an example, a signal received through the second antenna 642 may be transmitted as a second Rx signal to the communication processor 260 through the second antenna tuning circuit 642*a*, the second RFFE 632, and the RFIC 610.

According to an embodiment, when the electronic device 101 operates in MIMO, the electronic device 101 may be configured with a rank for MIMO operation by the BS. The electronic device 101 may receive a signal transmitted based on MIMO from the BS through the first antenna 641 and the second antenna 642. For convenience of description, a signal received through the first antenna 641 may be referred to as a first signal, and a signal received through the second antenna 642 may be referred to as a second signal.

According to an embodiment, the first RFFE 631 may include at least one duplexer or at least one diplexer to process a Tx signal and an Rx signal together. In an example, the second RFFE 632 may include at least one duplexer or at least one diplexer to process a Tx signal and an Rx signal together.

In an embodiment, the first antenna 641 may be referred to as a "main antenna". The first antenna 641 may transmit an RF signal used in an LTE communication network and/or a 5G communication network. The first antenna 641 may receive an RF signal used in the LTE communication network and/or the 5G communication network. In an embodiment, the first antenna 641 may transmit an RF signal used in the LTE communication network and an RF signal used in the 5G communication network in time division multiplexing (TDM). The transmission scheme of the first antenna 641 is not limited to the foregoing example.

In an embodiment, the first antenna 641 may be a Tx antenna or a primary Rx antenna (PRx antenna), and transmit and receive RF signals. The electronic device 101, which does not include a diversity Tx antenna, may mitigate degradation of an RF signal based on switching an Rx antenna to a diversity Rx antenna (DRx antenna), when the quality of a voice call service (or quality of service (QOS) or the quality of a voice call) is poor. For example, the electronic device 101 may receive an RF signal used for LTE communication and/or 5G communication through the second antenna 642. Because the DRx antenna and the Tx antenna are different, the electronic device 101 may not be able to determine whether a transmission channel of the Tx antenna is in a good condition based on a parameter (e.g., RSRP) associated with the DRx antenna. The electronic device 101 according to an embodiment may maintain the quality of the voice call service based on performing antenna tuning without switching the Rx antenna to the DRx antenna, based on identifying that the quality of the voice call service is poor. In an EN-DC situation, for example, the electronic device 101 may maintain connections based on both RATs without NR secondary cell group failure (SCGF) during execution of a voice over LTE (VOLTE) call, based on setting an antenna tuning value to a DC mode. In an NE-DC situation, the electronic device 101 may also maintain connections based on both RATs without LTE SCGF during execution of a VoNR call, based on setting the antenna tuning value to the DC mode.

Figure 7A:
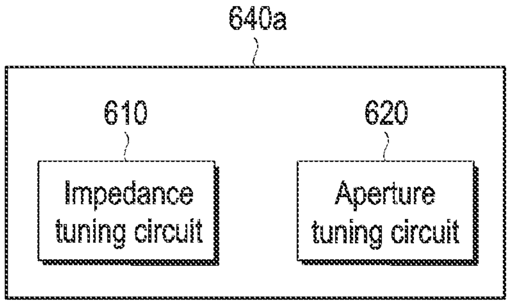
FIG. 7A is a diagram illustrating an example antenna tuning circuit according to various embodiments.

FIG. 7A is a block diagram illustrating an antenna tuning circuit according to various embodiments. FIG. 7B is a diagram illustrating an antenna tuning circuit according to various embodiments. Referring to FIG. 7A, an antenna tuning circuit 640*a* (e.g., the first antenna tuning circuit 641*a* or the second antenna tuning circuit 642*a* in FIG. 6) according to an embodiment may include at least one impedance tuning circuit 610 and/or at least one aperture tuning circuit 620. Although the second antenna tuning circuit 642*a* may be implemented identically to the first antenna tuning circuit 641*a*, they may also be implemented differently. The impedance tuning circuit 610 according to an embodiment may be configured to perform impedance matching with a network under the control of at least one processor (e.g., at least one of the processor 120 of FIG. 1, the communication processors 212 and 214 of FIG. 2A, or the integrated communication processor 260 of FIG. 2B). The aperture tuning circuit 620 according to an embodiment may change an antenna structure by turning on/off a switch under the control of the at least one processor.

According to an embodiment, the impedance tuning circuit 610 may be connected to an RFFE (e.g., the first RFFE 631 or the second RFFE 632 in FIG. 6) and to a duplexer of the RFFE. The impedance tuning circuit 610 may be connected to an antenna (e.g., the first antenna 641 or the second antenna 642 in FIG. 6), and a first aperture tuning circuit (not shown) and a second aperture tuning circuit (not shown) may be connected to a power rail connecting the impedance tuning circuit 610 and the antenna.

According to an embodiment, the electronic device 101 (e.g., the communication processor 260) may change a setting value of the antenna tuning circuit 640*a* based on the strength (e.g., at least one of the RSRP, signal to noise ratio (SNR), or SINR) of a received signal or whether an imbalance has occurred. In an embodiment, the electronic device 101 may control the on/off state of the switch included in the antenna tuning circuit 640*a* (e.g., the impedance tuning circuit 610 and/or the aperture tuning circuit 620) to be changed as described above in response to the change of the setting value of the antenna tuning circuit 640*a*.

Figure 7B:
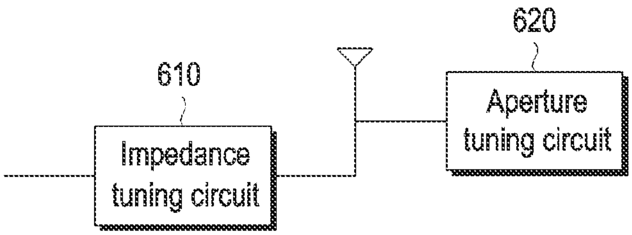
FIG. 7B is a diagram illustrating an example antenna tuning circuit according to various embodiments.

According to an embodiment, although one impedance tuning circuit 610 and one aperture tuning circuit 620 are shown in FIG. 7B as connected to one antenna, either the impedance tuning circuit 610 or the aperture tuning circuit 620 may be omitted, or a plurality of impedance tuning circuits 610 or a plurality of aperture tuning circuits 620 may be included for one antenna.

In an embodiment, the electronic device 101 may select an antenna tuning value to prioritize the quality of a voice call service based on execution of the voice call service. Based on the selected antenna tuning value, the electronic device 101 may mitigate degradation of the quality of the voice call service. For example, the electronic device 101 may determine an antenna tuning mode based on execution of a VOLTE call, such that the antenna is tuned to a frequency band used for a first cell (e.g., a primacy cell (P cell)) of the LTE network.

Figure 8:
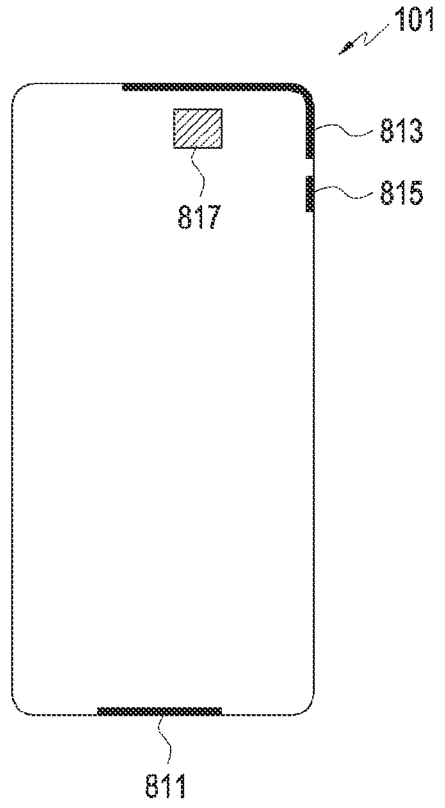
FIG. 8 is a diagram illustrating an example arrangement of antennas in an electronic device according to various embodiments.

FIG. 8 is a diagram illustrating an example arrangement of antennas in an electronic device according to various embodiments.

In an embodiment, the electronic device 101 may include a first antenna 811, a second antenna 813, a third antenna 815, and a fourth antenna 817. In an embodiment, the antennas 811, 813, 815, and 817 of FIG. 8 may be laser direct structuring (LDS) antennas formed in the form of a pattern in some areas within a housing of the electronic device 101. The antennas 811, 813, 815, and 817 may also be implemented as metal antennas on the housing, and the specific implementation is not limited.

In an embodiment, at least one of the antennas 811, 813, 815, and 817 of FIG. 8 may transmit and receive RF signals based on both RATs in DC. For example, the electronic device 101 may transmit and receive RF signals in an LTE band through the first antenna 811, and transmit and receive RF signals in a 5G band which is at least partially the same as the LTE band, based on refarming. The electronic device 101 may use the first antenna 811 as a Tx antenna and a PRx antenna. The first antenna 811 may transmit and receive an RF signal corresponding to a B66 band and/or an RF signal corresponding to an N5 band. The electronic device 101 may use any of the remaining antennas 813, 815, and 817 as a DRx antenna. For example, the electronic device 101 may receive an RF signal corresponding to the B66 band and/or an RF signal corresponding to the N5 band through the DRx antenna. In an embodiment, when a VOLTE call is executed during transmission of RF signals in the B66 band and the N5 band based on one antenna, the electronic device 101 may select an antenna tuning value that prioritizes the B66 band. When the antenna tuning value is adjusted to prioritize the B66 band, the transmission and reception performance of an RF signal in the N5 band may be degraded.

Figure 9A:
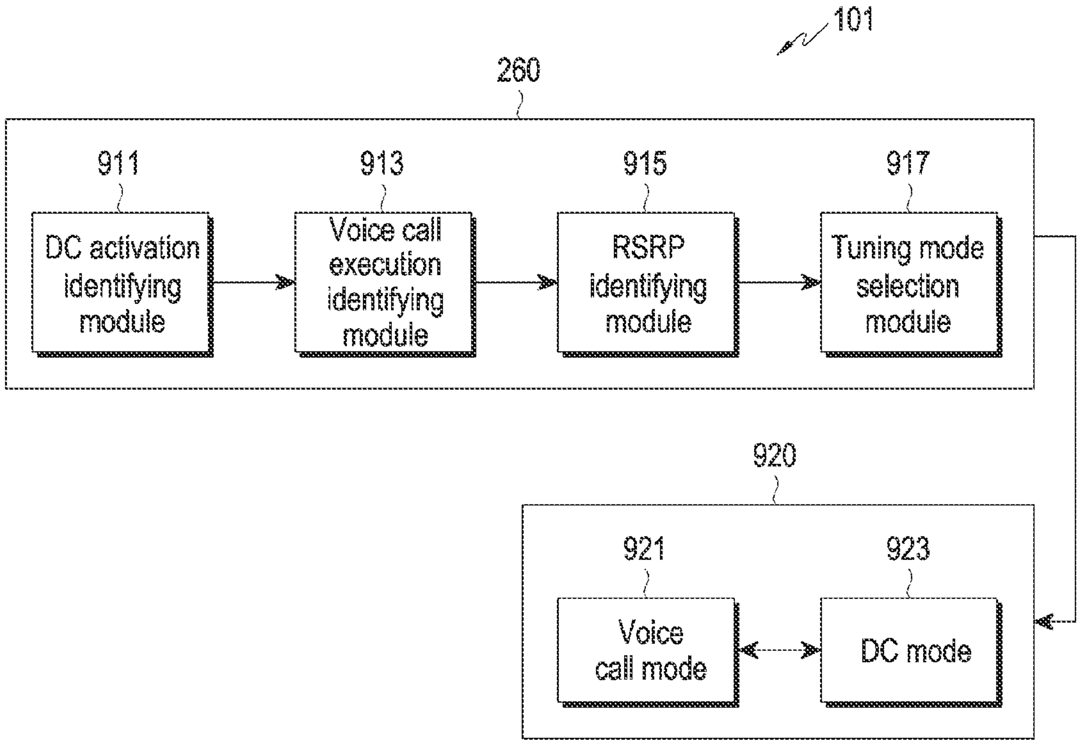
FIG. 9A is a block diagram illustrating an example configuration of an electronic device according to various embodiments.

FIG. 9A is a block diagram illustrating an example configuration of an electronic device according to various embodiments.

In an embodiment, the electronic device 101 may include a DC activation identifying module 911, a voice call execution identifying module 913, an RSRP identifying module 915, a tuning mode selection module 917, and an RFFE 920 (e.g., the first RFFE 232, the second RFFE 234, the third RFFE 236, the first RFFE 631, and/or the second RFFE 632). The DC activation identifying module 911 may be referred to as "dual connectivity active checker." The voice call execution confirmation module 913 may be referred to as "voice call service active checker." The RSRP identifying module 915 may be referred to as "quality of service monitor." The tuning mode selection module 917 may be referred to as "tuning mode selector." In an embodiment, the modules 911, 913, 915, and 917 included in the communication processor 260 may operate in the physical (PHY) layer (or L1). Further, each of the modules reference above may include various processing circuitry and/or executable program instructions. The DC activation identifying module 911 may identify whether a DC-based connection has been established based on identifying a network environment. For example, the DC activation identifying module 911 may identify whether it is in an EN-DC situation or an NE-DC situation. The voice call execution identifying module 913 may identify whether a voice call has been executed, based on a communication module (e.g., the communication module 190 of FIG. 1). For example, the voice call execution identifying module 913 may identify whether a VOLTE call based on LTE communication has been executed in the EN-DC situation. The voice call execution identifying module 913 may also identify whether a VoNR call based on 5G communication has been executed in the NE-DC situation. The RSRP identifying module 915 may identify the electric field of a P cell in which the voice call is being executed based on a signal received through an antenna. In an embodiment, the RSRP identifying module 915 may identify a filtered RSRP which is a measurement over a preset time period. The RSRP identifying module 915 may identify the RSRP of a first channel to which LTE communication is connected in a DC state where LTE communication and the 5G communication are connected using the same antenna. In an embodiment, the RSRP identifying module 915 may identify a parameter for identifying the electric field, other than the RSRP. For example, the RSRP identifying module 915 may identify the received signal strength indicator (RSSI) or SINR of the first channel to which a first RAT is connected in the DC state. The tuning mode selection module 917 may select an antenna tuning mode out of a DC mode or a voice call mode based on at least one of the identified RSRP, SINR, or RSSI. The tuning mode selection module 917 may select the antenna tuning mode based on identifying the electric field of LTE communication through which the VOLTE call is being executed in the DC state where LTE communication and 5G communication are connected using a first antenna (e.g., the first antenna 641). For example, the tuning mode selection module 917 may select the DC mode based on identifying that the electric field of LTE communication is good. The tuning mode selection module 917 may select the voice call mode based on identifying that the electric field of LTE communication is poor. The RFFE 920 may identify a tune code stored in memory (e.g., the memory 130) based on receiving a control signal from the communication processor 260. In an embodiment, the communication processor 260 may operate as an upper layer relative to the RFFE 920. When the DC mode is selected by the tuning mode selection module 917, the RFFE 920 may identify a tune code corresponding to a DC mode 923. The RFFE 920 may set the DC mode 923 based on inputting the tune code corresponding to the DC mode 923 to an antenna tuning circuit (e.g., the antenna tuning circuit 640*a*). The RFFE 920 may tune the characteristics of a signal transmitted and/or received through the antenna to maintain connections based on dual RATs, based on controlling capacitance corresponding to at least one capacitor included in the antenna tuning circuit 640*a* and/or an on/off state of the at least one switch according to the tune code corresponding to the DC mode 923. When the voice call mode is selected by the tuning mode selection module 917, the RFFE 920 may identify a tune code corresponding to a voice call mode 921. The RFFE 920 may set the voice call mode 921 based on inputting the tune code corresponding to the voice call mode 921 to the antenna tuning circuit 640*a*. The RFFE 920 may tune the characteristics of a signal transmitted and/or received through the antenna to improve the performance of an RAT associated with the voice call, based on changing the state of at least one element (e.g., a capacitor and/or a switch) included in the antenna tuning circuit 640*a* according to the tune code corresponding to the voice call mode 921. In an embodiment, the voice call mode 921 and the DC mode 923 shown as included in the RFFE are for illustrative purposes only, and code, a value, and/or an instruction associated with each mode may be stored in the memory 130. For example, when the quality of the voice call service is poor, the RFFE 920 may input a tune code that prioritizes an RAT supporting the voice call service to the antenna tuning circuit 640*a*. The RFFE 920 may input a tune code that maintains the performance of both RATs based on DC to the antenna tuning circuit 640*a*, based on identifying that the quality of the voice call service is good. In an embodiment, the modules 911, 913, 915, and 917 implemented (or stored) in the electronic device 101 may be implemented in the form of applications, programs, computer codes, instructions, routines, processes, software, firmware, or a combination of at least two of them, executable by a processor (e.g., at least one of the processor 120, the first communication processor 212, the second communication processor 214, or the integrated communication processor 260). For example, when the modules are executed, the processor 120 may perform operations corresponding to the respective modules. Accordingly, when it is said that "a specific module performs an operation", this may be understood as "as a specific module is executed, the processor 120 performs an operation corresponding to the specific module." In an embodiment, at least some of the modules may include a plurality of programs, to which the disclosure is not limited. At least some of the modules may be implemented in hardware (e.g., processing circuits (not shown)).

Figure 9B:
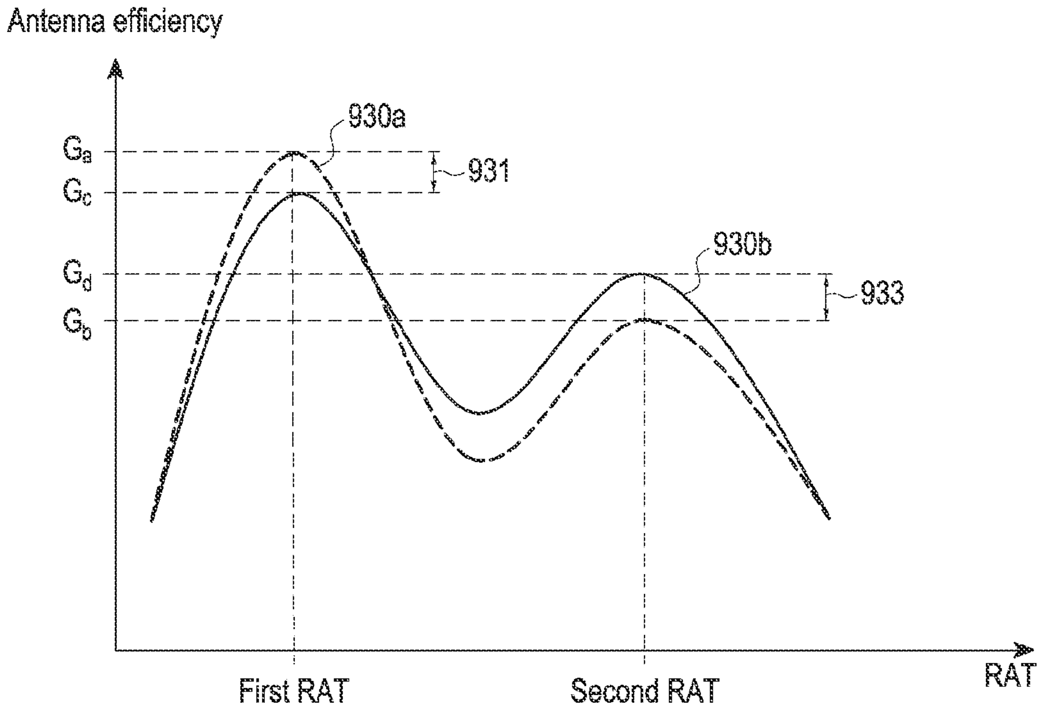
FIG. 9B is a graph illustrating antenna efficiency in a strong electric field in an electronic device according to various embodiments.

FIG. 9B is a graph illustrating antenna efficiency in a strong electric field in an electronic device according to various embodiments.

Figure 9C:
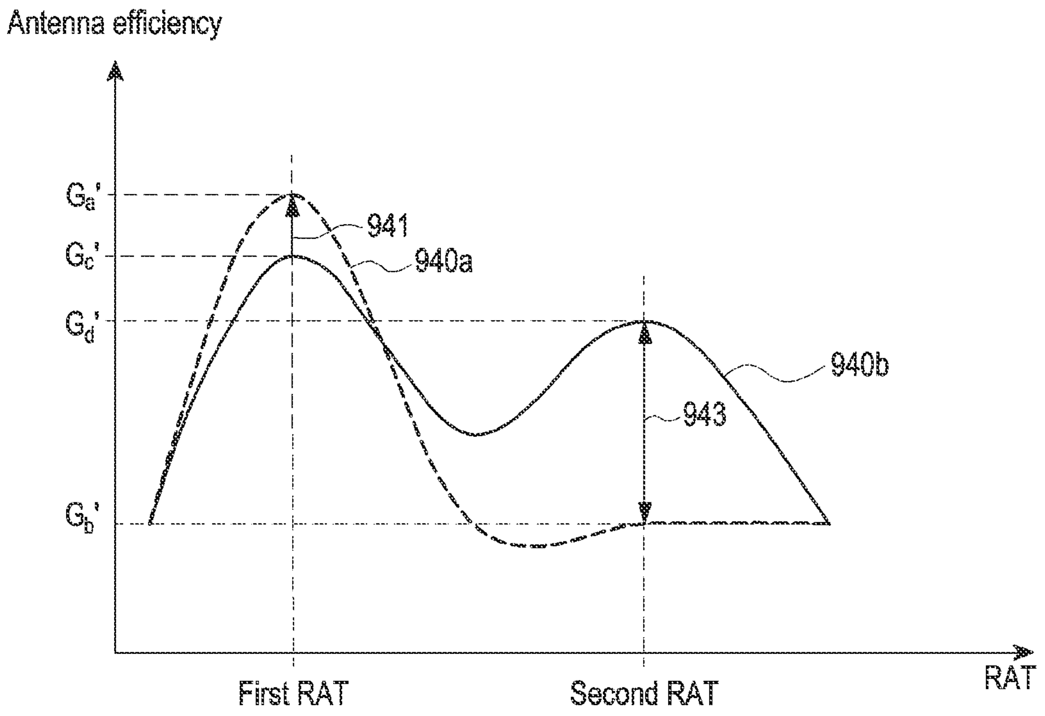
FIG. 9C is a graph illustrating antenna efficiency in a weak electric field in an electronic device according to various embodiments.

FIG. 9C is a graph illustrating antenna efficiency in a weak electric field in an electronic device according to various embodiments.

In an embodiment, the electronic device 101 may set the antenna tuning mode to the voice call mode or the DC mode in a DC situation. The electronic device 101 may identify whether it is in a DC state where it is connected to a first RAT and a second RAT, using a main antenna (e.g., the first antenna 641 and the first antenna 811). The electronic device 101 may also identify whether a voice call has been executed. The electronic device 101 may also identify an electric field condition based on the first RAT and/or the second RAT. For example, the electronic device 101 may identify whether an electric field based on the first RAT is strong or weak. The electronic device 101 may identify whether an electric field based on the second RAT is strong or weak. For example, the electronic device 101 may perform antenna tuning to the voice call mode based on identifying that the strength of a signal received through the main antenna is less than a threshold.

Referring to FIG. 9B, a graph 930*a* of overall antenna efficiency when the electronic device 101 operates in the voice call mode and a graph 930*b* of overall antenna efficiency when the electronic device 101 operates in the DC mode, in a strong electric field are shown. The electronic device 101 may perform a voice call based on the first RAT. A difference 931 between antenna efficiency Ga of the first RAT in the voice call mode and antenna efficiency Gc of the first RAT in the DC mode may be relatively small. Even when the electronic device 101 is set to the DC mode, it may maintain a good channel condition in the first RAT in which the voice call is executed. Antenna efficiency Ga of the second RAT in the DC mode may have a value greater than antenna efficiency Gb of the second RAT in the voice call mode by a difference 933 shown in the graph. The electronic device 101 may maintain the reception performance of a secondary cell (S cell) relatively the same through a DRx antenna (e.g., the second antenna 642). The electronic device 101 may transmit signals based on the first RAT and the second RAT, using only one antenna (e.g., the first antenna 641). When the electronic device 101 operates in the voice call mode, transmission performance based on the second RAT may be reduced. The electronic device 101 may stabilize connections based on the first RAT and the second RAT based on setting the DC mode in which the transmission and reception performance of the second RAT is relatively good.

Referring to FIG. 9C, a graph 940*a* of overall antenna efficiency when the electronic device 101 operates in the voice call mode and a graph 940*b* of overall antenna efficiency when the electronic device 101 operates in DC mode, in a weak electric field are shown. The electronic device 101 may perform a voice call based on the first RAT. A difference between antenna efficiency Ga' of the first RAT in the voice call mode and antenna efficiency Gc' of the first RAT in the DC mode may be relatively great. When the electronic device 101 is set to the DC mode, antenna efficiency Gc' of the first RAT in which a voice call is executed may decrease, and the quality of the voice call may be degraded. Antenna efficiency Ga' of the second RAT in the DC mode may have a value greater than antenna efficiency Gb' of the second RAT in the voice call mode by a difference 943 shown in the graph. The electronic device 101 may obtain the transmission and reception performance of the second RAT in the DC mode. The electronic device 101 may set the antenna tuning mode to the voice call mode so that the quality of the voice call service remains good, based on increasing transmission and reception performance 941 of the first RAT in which the voice call is executed.

Figure 10A:
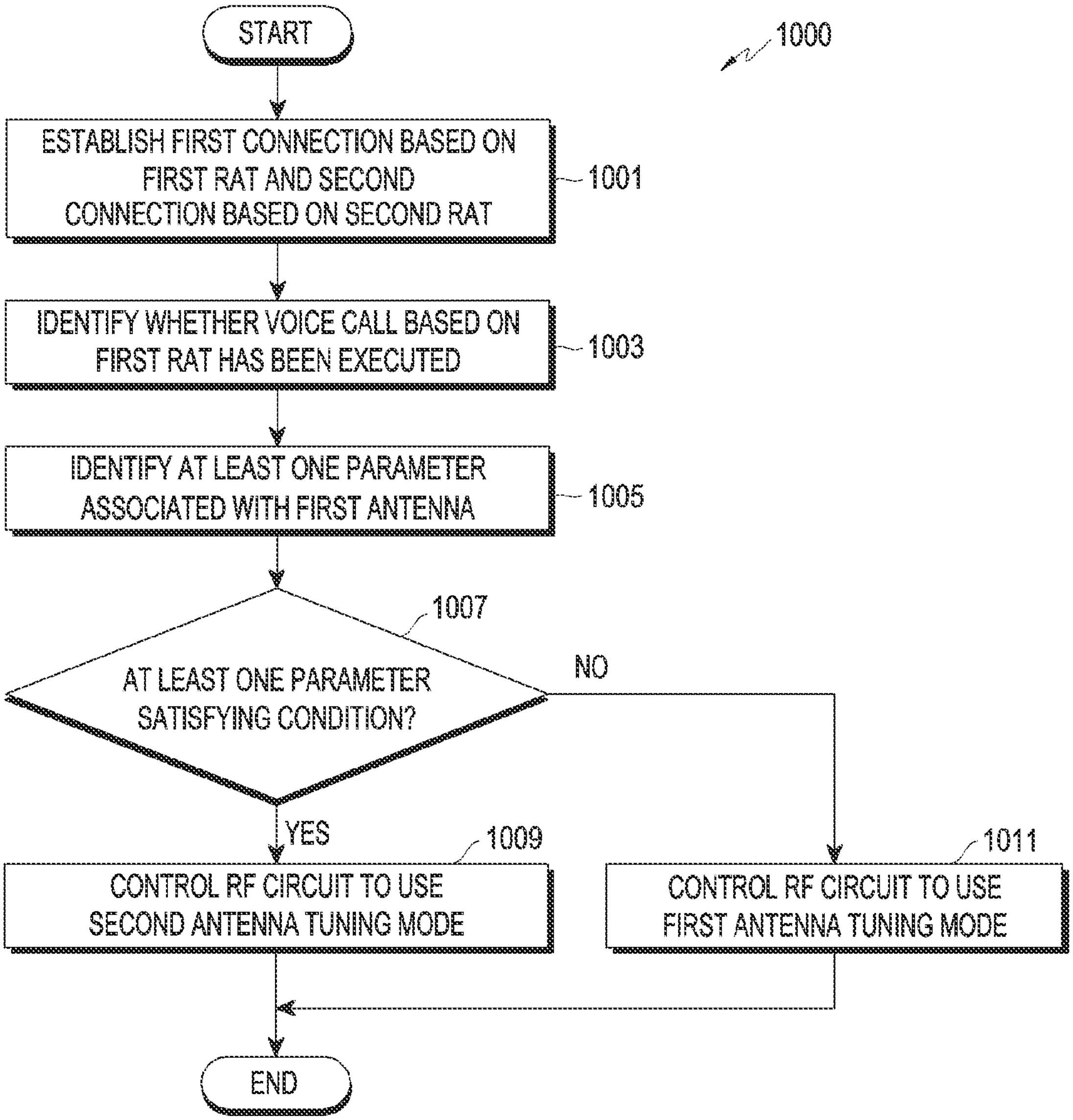
FIG. 10A is a flowchart illustrating an example method of operating an electronic device according to various embodiments.

FIG. 10A is a flowchart 1000 illustrating an example method of operating an electronic device according to various embodiments.

According to an embodiment, the electronic device 101 (e.g., at least one of the processor 120, the first communication processor 212, the second communication processor 214, and/or the integrated communication processor 260) may establish a first connection based on a first RAT and a second connection based on a second RAT in operation 1001. In an embodiment, the electronic device 101 may establish the first connection based on the first RAT and the second connection based on the second RAT in DC. The DC may include EN-DC, NG-RAN E-UTRA-NR dual connectivity (NGEN-DC), NE-DC, or NR-NR dual connectivity (NR-DC). Herein, the first RAT and the second RAT are not necessarily different. For example, the first RAT and the second RAT may be the same RAT, such as in NR-DC, and an RAT may be referred to as a node. For example, after establishing the first connection based on the RAT of an MCG, the electronic device 101 may receive an RRC reconfiguration message from a network corresponding to the RAT of the MCG. The electronic device 101 may perform a measurement based on a measurement object (MO) of an inter-RAT included in the RRC reconfiguration message. When a measurement result satisfies a reporting condition (e.g., a B1 event), the electronic device 101 may perform measurement reporting. The network of the MCG may determine whether to add an SCG based on a measurement report. When SCG addition is determined, the network of the MCG may transmit an RRC reconfiguration message for an additional SCG configuration to the electronic device 101. The electronic device 101 may perform a random access (RA) procedure with an SCG network based on information included in the RRC reconfiguration message, and thus establish a second connection with the SCG network. In an embodiment, the electronic device 101 (e.g., the DC activation identifying module 910) may identify whether the electronic device 101 is attached to a DC network. Based on identifying that the electronic device 101 is attached to the DC network, the electronic device 101 may determine a tune code to be input to an antenna tuning circuit (e.g., the antenna tuning circuit 640*a*) to tune an antenna to the first RAT and the second RAT. An antenna tuning value that prioritizes DC may be referred to as the "DC mode."

In an embodiment, the electronic device 101 may identify whether a voice call based on the first RAT is executed in operation 1003. The electronic device 101 (e.g., the voice call execution identifying module 920) may identify whether the voice call is executed and identify a network associated with the voice call. In an embodiment, the first RAT may be associated with LTE, and the second RAT may be associated with NR. The voice call may be based on VOLTE. For example, the electronic device 101 may identify whether a VOLTE call is executed in an EN-DC situation. In an embodiment, the first RAT may be associated with NR, and the second RAT may be associated with LTE. The voice call may be based on VoNR. For example, the electronic device 101 may identify whether a VoNR call is executed in an NE-DC situation.

In an embodiment, when identifying that the voice call is executed, the electronic device 101 may identify at least one parameter associated with a main antenna (e.g., the first antenna 641 of FIG. 6) in operation 1005. In an embodiment, the electronic device 101 may identify the strength of a signal received through a PRx antenna. For example, the electronic device 101 may identify an RSRP or SINR value of the antenna. The electronic device 101 may identify an RSRP value or SINR value of an LTE P cell based on identifying that a VOLTE call is executed in the EN-DC situation. In an embodiment, the electronic device 101 may start a real-time transport protocol (RTP) timer and also identify whether the timer has expired.

In an embodiment, the electronic device 101 may identify whether the identified at least one parameter satisfies a condition associated with the quality of the voice call in operation 1007. In an embodiment, the condition associated with the quality of the voice call may be that an RSRP value is less than a threshold. For example, the threshold may be about −106 dBm, and the specific value of the threshold is not limited. Based on identifying that the RSRP value of the antenna is less than −106 dBm, the electronic device 101 may identify that the condition associated with the quality of the voice call is satisfied. Based on identifying that the condition associated with the quality of the voice call is satisfied, the electronic device 101 may identify that the quality of the voice call is poor. In an embodiment, the electronic device 101 may also identify that the quality of the voice call is poor based on identifying that the RTP timer has expired.

In an embodiment, when the at least one parameter satisfies the condition associated with the quality of the voice call (yes in operation 1007), the electronic device 101 may control an RF circuit to use the second antenna tuning mode in operation 1009. For example, the electronic device 101 may control the RF circuit to use the voice call mode. In an embodiment, the voice call mode may be an antenna tuning mode that prioritizes a voice call. In an embodiment, the RF circuit may include at least one of an RFIC (e.g., the RFIC 610), an RFFE (e.g., the first RFFE 631), an antenna tuning circuit (e.g., the first antenna tuning circuit 641*a*), an antenna tuning circuit (e.g., the first antenna tuning circuit 641*a*), or an antenna (e.g., the first antenna 641). The electronic device 101 may determine a tuning value for a Tx antenna to prioritize the voice call, based on identifying that the voice call has poor quality. The electronic device 101 may adjust a setting value of the antenna tuning circuit (e.g., the first antenna tuning circuit 641*a* and/or the antenna tuning circuit 640*a*) to prioritize the quality of the voice call service.

In an embodiment, when the at least one parameter does not satisfy the condition associated with the quality of the voice call (no in operation 1007), the electronic device 101 may control the RF circuit to use the first antenna tuning mode in operation 1011. For example, the electronic device 101 may control the RF circuit to use the DC, dual connectivity, mode. In an embodiment, the DC mode may be an antenna tuning mode to maintain the first connection based on the first RAT and the second connection based on the second RAT. The electronic device 101 may maintain the connections based on both RATs without SCGF, based on inputting a tune code corresponding to the DC mode to the antenna tuning circuit 640*a* in consideration of the quality of DC-based communication. In an embodiment, the electronic device 101 may transmit an RF signal in an LTE band (e.g., the B66 band) and an RF signal in a 5G band (e.g., the n5 band) through the main antenna (e.g., the first antenna 641 and/or the first antenna 811) in the EN-DC situation. When the electronic device 101 performs antenna tuning to the LTE band based on identifying that the VOLTE call is executed, RF signal transmission performance in the 5G band may be degraded. As the number of 5G refarming bands supported by the main antenna increases, the degradation of the RF signal transmission performance in the 5G band may occur to more DC combinations. The electronic device 101 may identify an electric field to prevent and/or reduce the degradation of the signal transmission performance of the S cell, caused by antenna tuning to the P cell. For example, the electronic device 101 may identify the RSRP value of the main antenna. Based on identifying that the RSRP value of the main antenna is equal to or greater than a threshold, the electronic device 101 may adjust an antenna tuning value to perform reliable communication in the DC environment. Based on setting the antenna tuning value to the DC mode, the electronic device 101 may maintain the connections based on both RATs without SCGF.

Figure 10B:
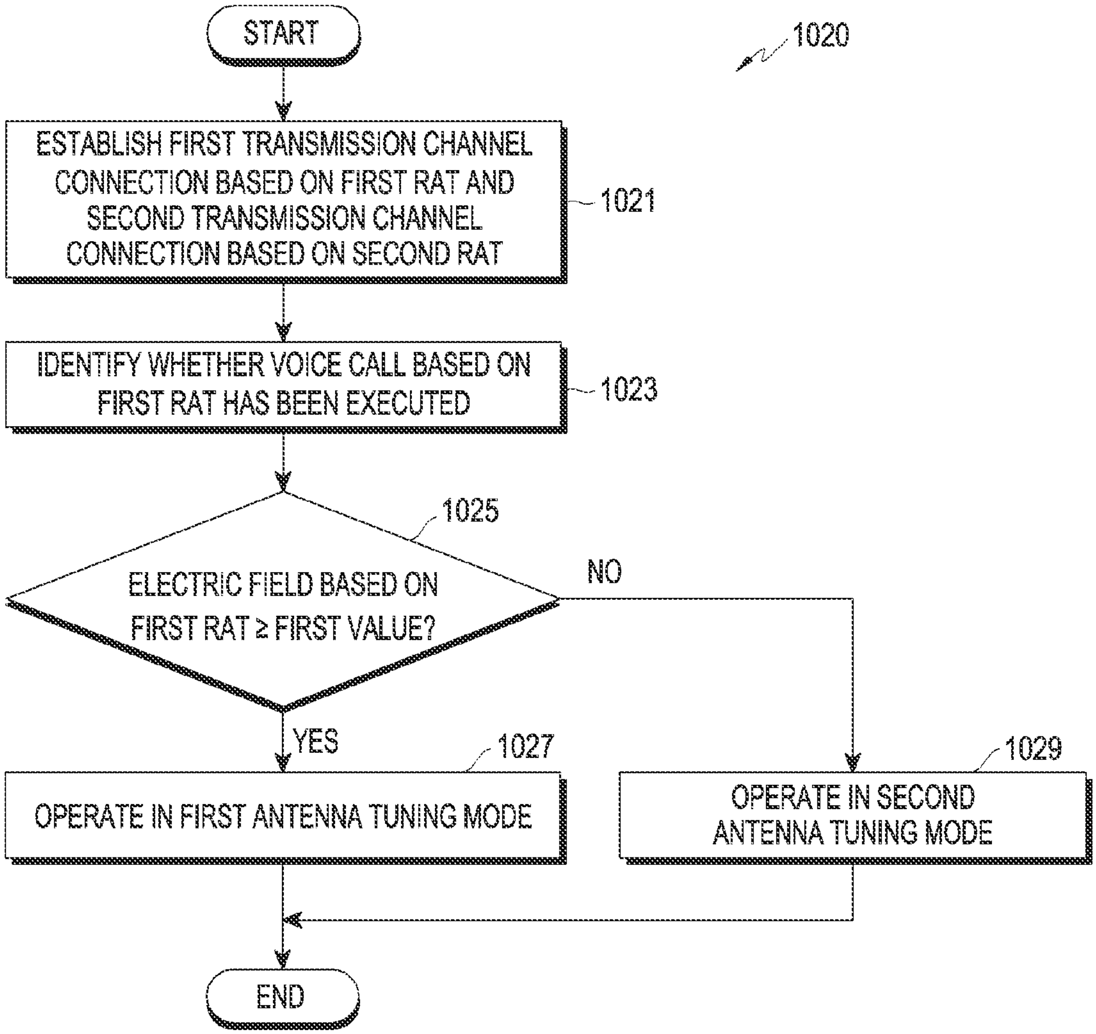
FIG. 10B is a flowchart illustrating an example method of operating an electronic device according to various embodiments.

FIG. 10B is a flowchart 1020 illustrating an example method of operating an electronic device according to various embodiments.

According to an embodiment, the electronic device 101 (e.g., at least one of the processor 120, the first communication processor 212, the second communication processor 214, and/or the integrated communication processor 260) may establish a first transmission channel connection based on a first RAT and a second transmission channel connection based on a second RAT, using one of a plurality of antennas 197, 242, 244, 246, 248, 641, 642, 811, 813, 815, and 817 in operation 1021. For example, the electronic device 101 may operate in a DC state based on establishing the first transmission channel connection and the second transmission channel connection using the first antenna 641. In an embodiment, the first antenna 641 may be an antenna configured to transmit and receive RF signals in a frequency band corresponding to the first RAT and RF signals in a frequency band corresponding to the second RAT. In an embodiment, the first RAT may be an RAT associated with a voice call. In an embodiment, the first RAT and the second RAT may be different. At least a part of the frequency band corresponding to the second RAT may be the same as the frequency band corresponding to the first RAT. For example, the frequency band corresponding to the second RAT may be referred to as a "refarming band".

In an embodiment, the electronic device 101 may identify whether a voice call based on the first RAT has been executed in operation 1023. For example, when the electronic device 101 operates in an EN-DC state, the first RAT may be associated with LTE, the second RAT may be associated with NR, and the voice call may be based on VOLTE. When the electronic device 101 operates in an NE-DC state, the first RAT may be associated with NR, the second RAT may be associated with LTE, and the voice call may be based on VoNR. In an embodiment, the electronic device 101 may set an antenna tuning mode to the DC mode based on identifying that the voice call has not been executed. For example, the electronic device 101 may control the state of at least one element (e.g., a capacitor and/or a switch) included in an antenna tuning circuit (e.g., the antenna tuning circuit 640*a*) based on identifying a tune code corresponding to the DC mode stored in memory (e.g., the memory 130).

In an embodiment, the electronic device 101 may identify whether an electric field based on the first RAT is equal to or greater than a first value during execution of the voice call in operation 1025. In an embodiment, the electronic device 101 may identify the electric field based on the first RAT based on identifying an RSSI corresponding to the first antenna 641 during execution of the voice call. The first value may be a threshold for identifying whether the electric field based on the first RAT is a strong electric field or a weak electric field. The threshold may be changed according to an embodiment of the disclosure.

In an embodiment, when the electric field based on the first RAT is equal to or greater than the first value, the electronic device 101 may operate in a first antenna tuning mode in operation 1027. The electronic device 101 may set the first antenna 641 to be tuned to the first RAT and the second RAT based on identifying that the electric field of the RAT in which the voice call is executed is strong. For example, the electronic device 101 may control the state of at least one element included in the antenna tuning circuit 640*a* based on inputting a tune code corresponding to the DC mode to the antenna tuning circuit 640*a*. Based on setting the antenna tuning mode to the DC mode, the electronic device 101 may stably maintain the first transmission channel connection and the second transmission channel connection.

In an embodiment, when the electric field based on the first RAT is less than the first value, the electronic device 101 may operate in a second antenna tuning mode in operation 1029. The electronic device 101 may set the first antenna 641 to be tuned to the first RAT based on identifying that the electric field of the RAT in which the voice call is executed is weak. For example, the electronic device 101 may control the state of at least one element included in the antenna tuning circuit 640*a* based on inputting a tune code corresponding to the voice call mode to the antenna tuning circuit 640*a*. Based on setting the antenna tuning mode to the voice call mode, the electronic device 101 may maintain the first transmission channel connection.

In an embodiment, the electronic device 101 may identify the strength of a signal received through the first antenna 641 based on the first RAT during execution of the voice call. The electronic device 101 may identify that the strength of the received signal is less than a threshold based on monitoring the state of the receive channel based on the first RAT. For example, the electronic device 101 may switch from the first antenna tuning mode to the second antenna tuning mode for prioritizing voice call quality based on identifying that a filtered RSRP decreases below a threshold. In a weak electric field situation, the electronic device 101 may maintain the first transmission channel connection based on the first RAT in which the voice call is executed, based on switching the antenna tuning mode from the DC mode to the voice call mode. In an embodiment, when the first antenna tuning mode is switched to the second antenna tuning mode according to a change in the electric field, a parameter associated with antenna sensitivity of the second transmission channel connection based on the second RAT may decrease. For example, the electronic device 101 may identify the parameter associated with the antenna sensitivity of the second transmission channel connection based on identifying the RSRP or SINR of a signal received through the first antenna 641 based on the second RAT. When the DC mode is switched to the voice call mode, the RSRP or SINR based on the second RAT may decrease based on the first antenna 641 being tuned to the first RAT associated with the voice call.

In an embodiment, the electronic device 101 may identify whether the voice call has been terminated. Based on identifying that the voice call has been terminated, the electronic device 101 may switch from the second antenna tuning mode to the first antenna tuning mode. For example, the electronic device 101 may switch the antenna tuning mode to the DC mode based on identifying that the voice call has been terminated in the state where the voice call mode has been set in the weak electric field.

Figure 11:
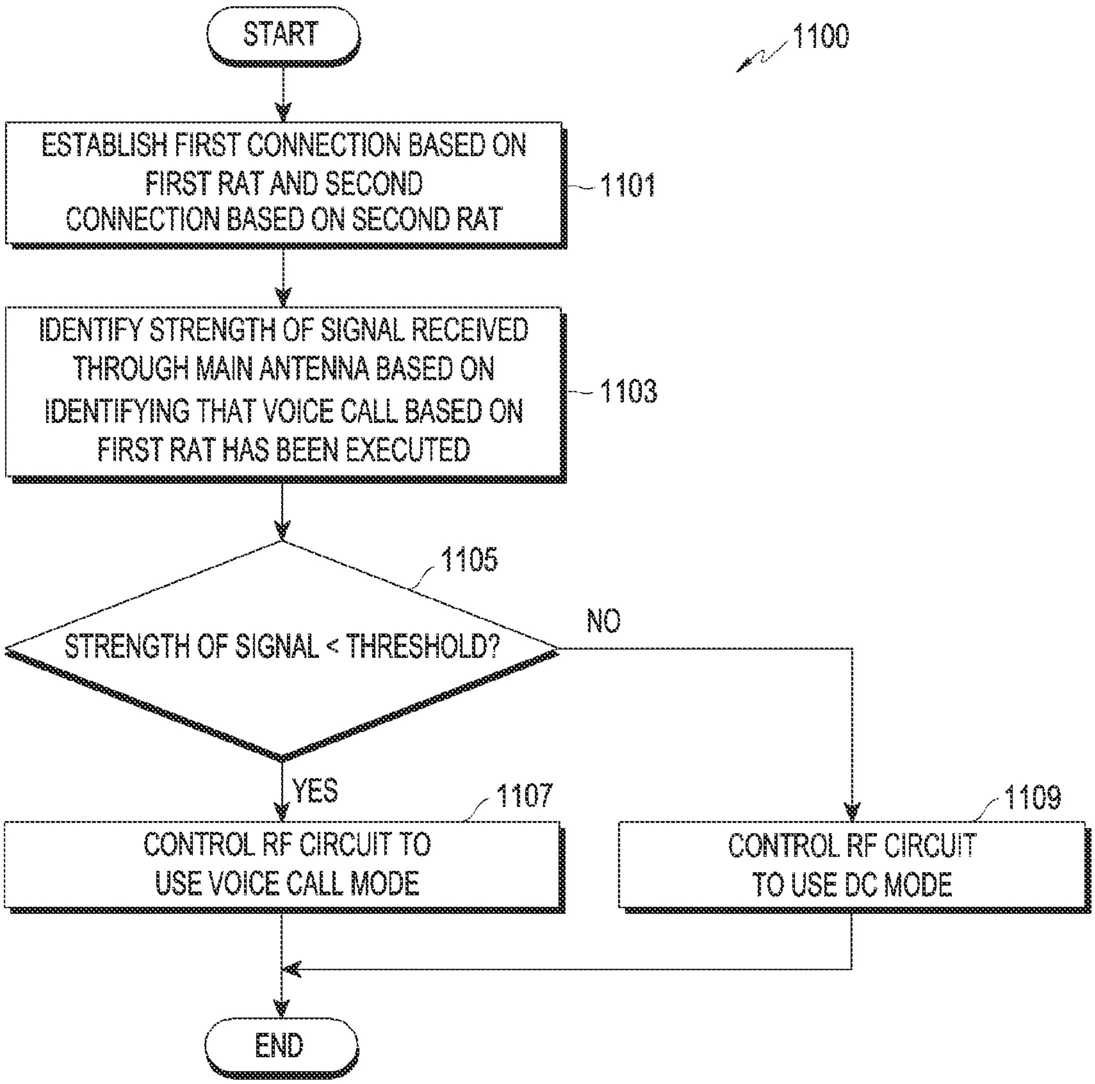
FIG. 11 is a flowchart illustrating an example method of operating an electronic device according to various embodiments.

FIG. 11 is a flowchart 1100 illustrating an example method of operating an electronic device according to various embodiments.

According to an embodiment, the electronic device 101 (e.g., at least one of the processor 120, the first communication processor 212, the second communication processor 214, and/or the integrated communication processor 260) may establish a first connection based on a first RAT and a second connection based on a second RAT in operation 1101. The establishment of the first connection based on the first RAT and the second connection based on the second RAT, such as establishment of DC-based connections, has been described above in detail and will not be repeated herein.

In an embodiment, the electronic device 101 may identify the strength of a signal received through a main antenna (e.g., the first antenna 641 or the first antenna 811) based on identifying a voice call based on the first RAT having been executed in operation 1103. The electronic device 101 may identify the strength of the signal received through the main antenna based on an RSRP or SINR value. In an embodiment, the main antenna may transmit and receive RF signals in a frequency band corresponding to the first RAT and RF signals in a frequency band corresponding to the second RAT, while the electronic device 101 maintains the connections based on the different first and second RATs. In an embodiment, the frequency band corresponding to the second RAT may be a refarming band for the frequency band corresponding to the first RAT. For example, at least a part of the frequency band corresponding to the second RAT may be the same as the frequency band corresponding to the first RAT.

In an embodiment, the electronic device 101 may identify whether the strength of the received signal is less than a threshold in operation 1105. In an embodiment, the electronic device 101 may estimate the states of transmission channels of the first RAT and the second RAT based on identifying the states of reception channels by identifying the strengths of received signals of the first RAT and the second RAT. The electronic device 101 may transmit and receive RF signals in the LTE band and RF signals in the 5G band through the same antenna (Tx/PRx). For example, based on identifying that the reception channel of LTE network communication and/or the 5G network communication is poor, the electronic device 101 may identify that the corresponding transmission channel is also poor. Based on identifying that the reception channel of LTE network communication and/or 5G network communication is good, the electronic device 101 may identify that the corresponding transmission channel is also good.

In an embodiment, when the strength of the received signal is less than the threshold (yes in operation 1105), the electronic device 101 may control the RF circuit such that the main antenna uses the voice call mode in operation 1107. The electronic device 101 may perform the voice call based on the first RAT in the DC state where the electronic device 101 is connected to the first RAT and the second RAT using the same antenna. The electronic device 101 may improve the transmission/reception performance of the first channel, based on controlling an antenna tuning mode to the voice call mode when the reception strength of the first channel to which the first RAT is connected is less than the threshold during execution of the voice call based on the first RAT. Based on controlling the antenna tuning mode to the voice call mode, the electronic device 101 may maintain a good quality of the voice call service performed on the first channel. The voice call mode may be an antenna tuning mode configured to maximize and/or increase the transmission/reception performance of the first channel. The electronic device 101 may set an antenna tuning value to the voice call mode to maintain the good quality of the voice call service.

In an embodiment, when the strength of the received signal is equal to or greater than the threshold (no in operation 1105), the electronic device 101 may control the RF circuit such that the main antenna uses the DC mode in operation 1109. The electronic device 101 may control the RF circuit to use the DC mode based on identifying that the reception channel of the first RAT is in a good condition. The electronic device 101 may perform the voice call based on the first RAT in the DC state where the electronic device 101 is connected to the first RAT and the second RAT using the same antenna. The electronic device 101 may efficiently secure the transmission and reception performance of the first channel to which the first RAT is connected as well as the second channel to which the second RAT is connected, based on controlling the antenna tuning mode to the DC mode when the reception strength of the first channel connected to the first RAT is equal to or greater than the threshold during execution of the voice call based on the first RAT. For example, the electronic device 101 may stably maintain dual RAT connections without SCGF by securing the transmission performance of the second channel (e.g., 5G), based on the DC mode. The DC mode may be an antenna tuning mode configured in consideration of the transmission and reception performances of both the first and second channels. Based on setting the antenna tuning value to the DC mode, the electronic device 101 may maintain the dual RAT connections without SCGF.

Figure 12A:
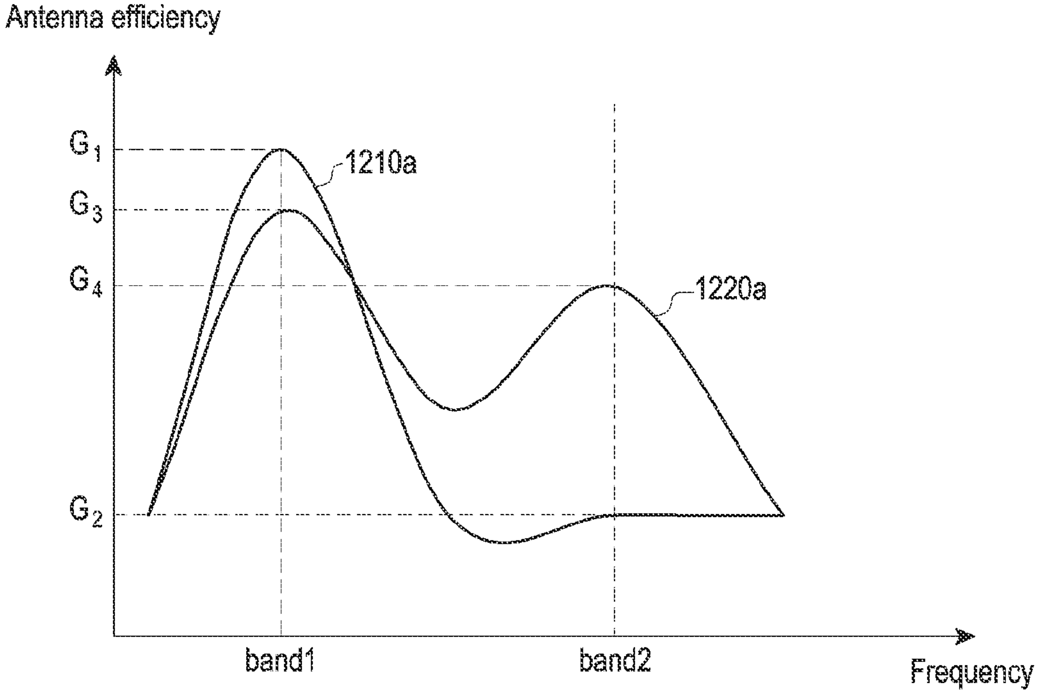
FIG. 12A is a graph illustrating antenna efficiency in an electronic device according to various embodiments.

FIG. 12A is a graph illustrating antenna efficiency of an electronic device according to various embodiments.

In an embodiment, the electronic device 101 may set an antenna tuning value to the voice call mode or the DC mode in an EN-DC situation. The electronic device 101 may identify whether it is placed in an EN-DC state. The electronic device 101 may also identify whether a VOLTE call has been executed. The electronic device 101 may identify an electric field state based on a first RAT and/or a second RAT. For example, the electronic device 101 may identify whether the electric field based on the first RAT is a strong or weak electric field. The electronic device 101 may identify whether the electric field based on the second RAT is a strong or weak electric field. For example, the electronic device 101 may perform antenna tuning in the voice call mode based on identifying that the strength of a signal received through a main antenna (e.g., the first antenna 641 or the first antenna 811) is less than a threshold. Referring to FIG. 12A, a graph 1210*a* illustrating the antenna efficiency of the main antenna when the electronic device 101 operates in the voice call mode and a graph 1220*a* illustrating the antenna efficiency of the main antenna when the electronic device 101 operates in the DC mode are shown. The electronic device 101 may maintain a good quality of a voice call service based on an increase in antenna efficiency $G_1$ of the first RAT (e.g., a first band (band1) or the B66 band) and a decrease in antenna efficiency $G_2$ of the second RAT (e.g., a second band (band2) or the n5 band) in the voice call mode. The electronic device 101 may maintain dual RAT connections without SCGF, based on a relative decrease in antenna efficiency $G_3$ of the first RAT relative to the voice call mode and an increase in antenna efficiency $G_4$ of the second RAT (e.g., the n5 band) relative to the voice call mode, in the DC mode. Based on the DC mode, the electronic device 101 may relatively improve the transmission and reception performance of an RF signal in the NR band during the VOLTE call, thereby improving the transmission performance of the second RAT (e.g., the second band or the n5 band) using the first antenna and maintaining the dual RAT connections reliably.

Figure 12B:
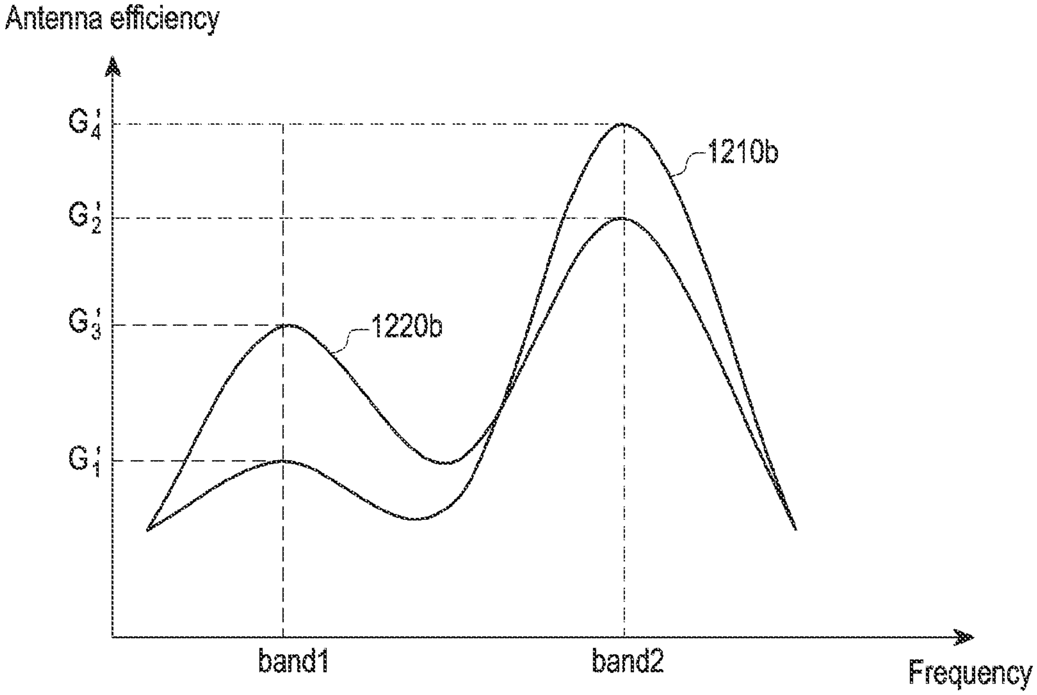
FIG. 12B is a graph illustrating antenna efficiency in an electronic device according to various embodiments.

FIG. 12B is a graph illustrating antenna efficiency of an electronic device according to various embodiments.

In an embodiment, the electronic device 101 may set an antenna tuning value to the voice call mode or the DC mode in an NE-DC situation. The electronic device 101 may identify the strength of a received signal at an antenna based on execution of a VoNR call in the NE-DC situation. For example, the electronic device 101 may perform antenna tuning in the voice call mode based on identifying that the strength of the signal received through a main antenna (e.g., the first antenna 641 or the first antenna 811) is less than a threshold. Referring to FIG. 12B, a graph 1210*b* illustrating antenna efficiency of the main antenna when the electronic device 101 operates in the voice call mode and a graph 1220*b* illustrating antenna efficiency of the main antenna when the electronic device 101 operates in the DC mode are shown. The electronic device 101 may maintain a good quality of a voice call service based on an increase in antenna efficiency $G_4'$ of the second RAT (e.g., the second band (band2) or the n5 band) and a decrease in antenna efficiency $G_1'$ of the first RAT (e.g., the first band (band1) or the B66 band) in the voice call mode. In the DC mode, the electronic device 101 may maintain the dual RAT connections without SCGF, based on a relative increase in antenna efficiency $G_3'$ of the first RAT relative to the voice call mode and a relative decrease in antenna efficiency $G_2'$ of the second RAT relative to the voice call mode. Based on the DC mode, the electronic device 101 may relatively improve the transmission and reception performance of an RF signal in the LTE band during execution of the VoNR call, thereby improving the transmission performance of the first RAT (the first band) using the first antenna and maintaining the dual RAT connections stably.

Figure 13:
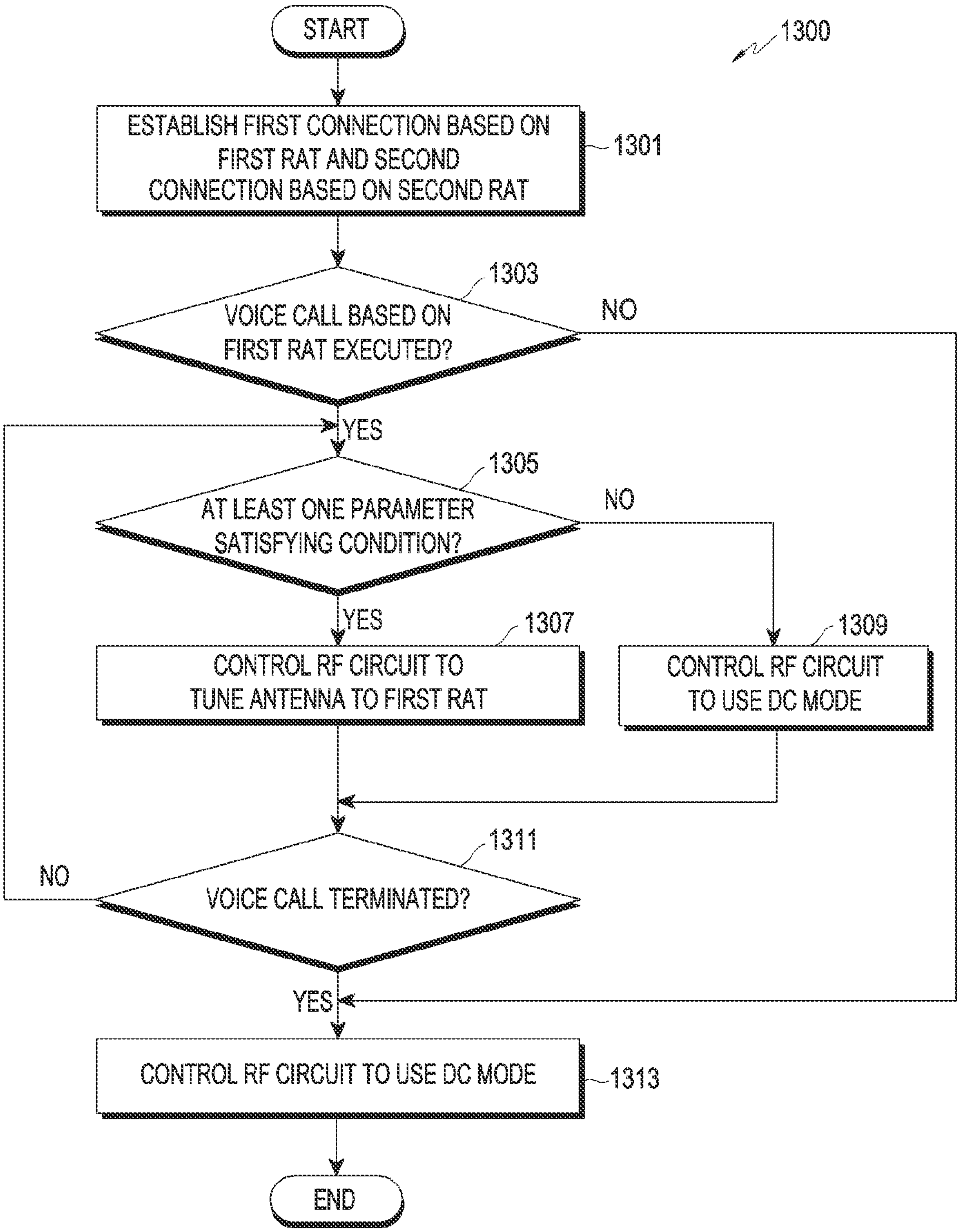
FIG. 13 is a flowchart illustrating an example method of operating an electronic device according to various embodiments.

FIG. 13 is a flowchart 1300 illustrating an example method of operating an electronic device according to various embodiments.

According to an embodiment, the electronic device 101 (e.g., at least one of the processor 120, the first communication processor 212, the second communication processor 214, and/or the integrated communication processor 260) may establish a first connection based on a first RAT and a second connection based on a second RAT in operation 1301. The establishment of the first connection based on the first RAT and the second connection based on the second RAT, for example, DC-based connections, has been described above in detail and may not be repeated here.

In an embodiment, the electronic device 101 may identify whether a voice call based on the first RAT has been executed in operation 1303. Identifying whether a voice call based on the first RAT has been executed, such as identifying whether a VOLTE call or a VoNR call has been executed, has been described above in detail and may not be repeated here. In an embodiment, based on identifying that a voice call has not been executed (no in operation 1303), the electronic device 101 may control the RF circuit to use the DC mode in operation 1313. Tuning an antenna to the first RAT and the second RAT, for example, adjusting a setting value of the antenna tuning circuit to prioritize the quality of DC-based communication, has been described above in detail and may not be repeated here.

In an embodiment, based on identifying that a voice call has been executed (yes in operation 1303), the electronic device 101 may identify whether at least one identified parameter satisfies a condition associated with the quality of the voice call in operation 1305. Identifying whether the at least one parameter satisfies the condition, for example, whether the at least one parameter is less than a threshold of a numerical value indicating the quality of a received signal, has been described in detail above and may not be repeated here.

In an embodiment, when the at least one parameter satisfies the condition associated with the quality of the voice call (yes in operation 1305), the electronic device 101 may control the RF circuit to use the voice call mode in operation 1307. Tuning the antenna to the first RAT, for example, adjusting the setting value of the antenna tuning circuit (e.g., the first antenna tuning circuit 641*a* and/or the antenna tuning circuit 640*a*) to prioritize the quality of the voice call service, has been described above in detail and may not be repeated here.

In an embodiment, when the at least one parameter does not satisfy the condition associated with the quality of the voice call (no in operation 1305), the electronic device 101 may control the RF circuit to use the DC mode in operation 1309. Tuning the antenna to the first RAT and the second RAT, for example, adjusting the setting value of the antenna tuning circuit to prioritize the quality of the DC-based communication, has been described above in detail and may not be repeated here.

In an embodiment, the electronic device 101 may identify whether the voice call has been terminated in operation 1311. Based on identifying that the voice call has been terminated (yes in operation 1311), the electronic device 101 may control the RF circuit to use the DC mode. For example, the electronic device 101 may control the RF circuit to switch from the voice call mode to the DC mode based on identifying that the voice call has been terminated based on operation 1307, operation 1311, and operation 1313.

In an embodiment, based on identifying that the voice call has not been terminated (no in operation 1311), the electronic device 101 may identify whether at least one identified parameter satisfies the condition associated with the quality of the voice call in operation 1305. The electronic device 101 may change the antenna tuning value based on repeating operations 1305 to 1311 until the voice call is terminated. In an embodiment, the electronic device 101 may repeat operations 1305 to 1311 based on a specified period (e.g., timer expiration) and/or a specified number of times. However, the repetition method is not limited. In an embodiment, the electronic device 101 may adjust the antenna tuning value based on identifying the quality of the voice call service until the voice call is terminated. For example, the electronic device 101 may change the antenna tuning value to the DC mode based on identifying that the strength of a signal received through the main antenna is equal to or greater than a threshold, while performing antenna tuning to the voice call mode based on operation 1307, operation 1311, operation 1305, and operation 1309. The electronic device 101 may change the antenna tuning value to the voice call mode based on identifying that the strength of a signal received through the main antenna is less than the threshold, while performing antenna tuning to the DC mode based on operation 1307, operation 1311, operation 1305, and operation 1309. The electronic device 101 may control the RF circuit to switch from the DC mode to the voice call mode to prioritize the quality of the voice call.

Figure 14:
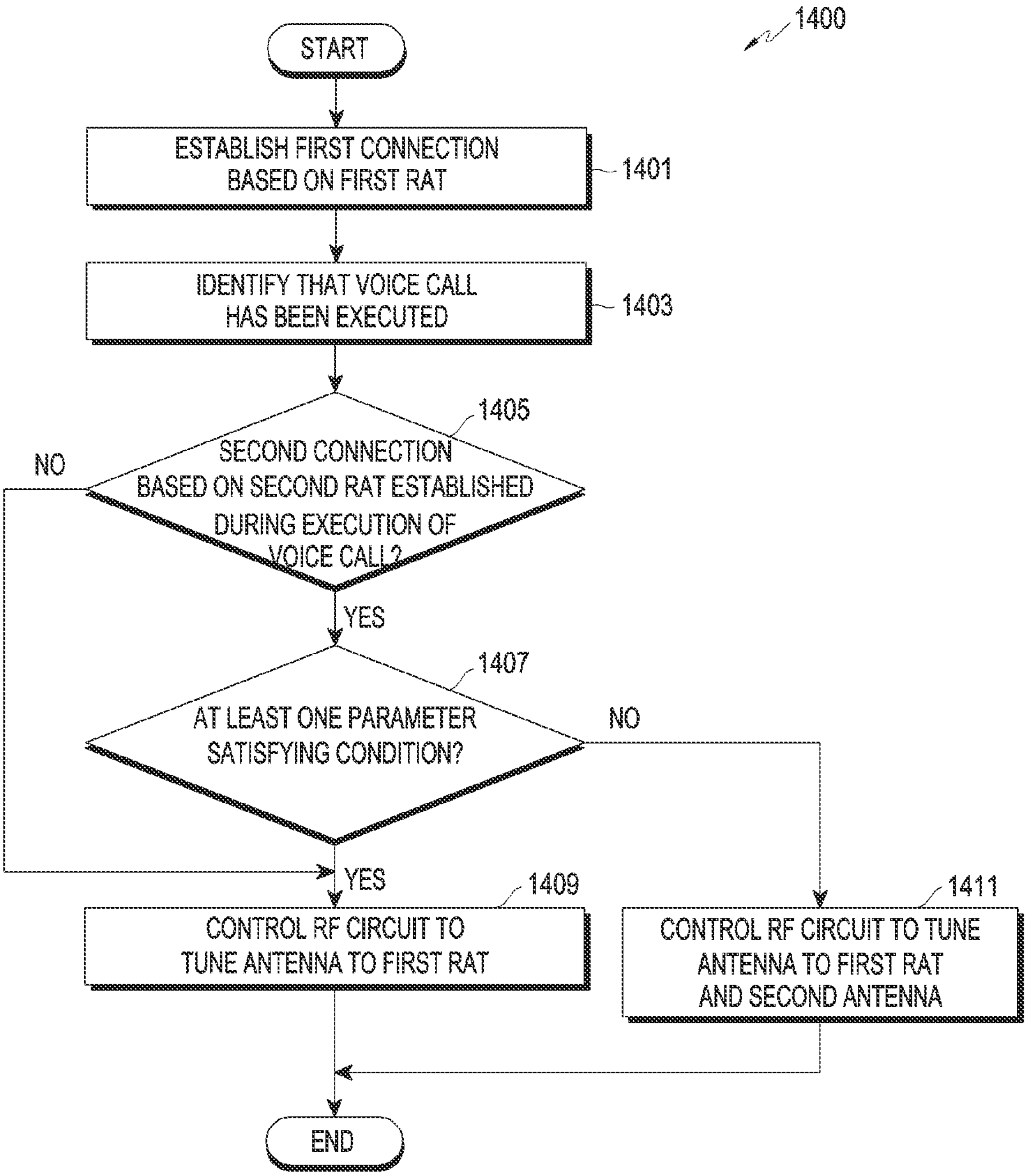
FIG. 14 is a flowchart illustrating an example method of operating an electronic device according to various embodiments.

FIG. 14 is a flowchart illustrating an example method of operating an electronic device according to various embodiments.

According to an embodiment, the electronic device 101 (e.g., at least one of the processor 120, the first communication processor 212, the second communication processor 214, and/or the integrated communication processor 260) may establish a first connection based on a first RAT in operation 1401.

In an embodiment, the electronic device 101 may identify that a voice call based on the first RAT has been executed in operation 1403.

In an embodiment, the electronic device 101 may identify whether a second connection based on a second RAT has been established during execution of the voice call in operation 1405. In an embodiment, based on identifying that the second connection based on the second RAT has not been established during the execution of the voice call (no in operation 1405), the electronic device 101 may control the RF circuit to tune the main antenna (e.g., the first antenna 641) to the first RAT in operation 1409.

In an embodiment, based on identifying that the second connection based on the second RAT has been established during the execution of the voice call (yes in operation 1405), the electronic device 101 may identify whether at least one parameter associated with the main antenna satisfies a condition associated with the quality of the voice call in operation 1407.

In an embodiment, when the at least one parameter satisfies the condition associated with the quality of the voice call (yes in operation 1407), the electronic device 101 may control the RF circuit to use the voice call mode in which the main antenna is tuned to the first RAT in operation 1409.

In an embodiment, when the at least one parameter does not satisfy the condition associated with the quality of the voice call (no in operation 1407), the electronic device 101 may control the RF circuit to use the DC mode in which the main antenna is tuned to the first RAT and the second RAT in operation 1411.

In an embodiment, the electronic device 101 may adjust an antenna tuning value based on identifying the quality of the voice call service, even when establishing DC-based connections after the execution of the voice call.

According to an embodiment, the electronic device (e.g., 101) may include: memory, (e.g. memory 130) storing instructions, a plurality of antennas (e.g., 197, 242, 244, 246, 248, 641, 642, 811, 813, 815, or 817) including a first antenna configured to transmit and receive RF signals corresponding to a first RAT and a second RAT, and a second antenna configured to receive RF signals corresponding to the first RAT and the second RAT, an RF circuit coupled to the plurality of antennas (e.g., 197, 242, 244, 246, 248, 641, 642, 811, 813, 815, or 817) and at least one communication processor, (e.g., 120, 212, 214, or 260) comprising processing circuitry, operatively coupled to the memory (e.g., 130) and the RF circuit. The instructions, when executed by at least one communication processor (e.g., 120, 212, 214, or 260), individually and/or collectively, may cause the electronic device (e.g., 101) to: establish a first transmission channel connection based on the first RAT and a second transmission channel connection based on the second RAT using one of the plurality of antennas (e.g., 197, 242, 244, 246, 248, 641, 642, 811, 813, 815, or 817); identify whether a voice call based on the first RAT is executed; operate in a first antenna tuning mode, based on an electric field based on the first RAT being equal to or greater than a first value, and operate in a second antenna tuning mode, based on the electric field based on the first RAT being less than the first value, during execution of the voice call. Based on the first antenna tuning mode being switched to the second antenna tuning mode according to a change in the electric field, a parameter associated with antenna sensitivity of the second transmission channel connection based on the second RAT may decrease.

According to an example embodiment, the instructions, when executed by at least one communication processor, individually and/or collectively (e.g., 120, 212, 214, or 260), may cause the electronic device (e.g., 101) to control the RF circuit to use the first antenna tuning mode, based on identifying that the voice call is not executed.

According to an example embodiment, the instructions, when executed by at least one communication processor, individually and/or collectively (e.g., 120, 212, 214, or 260), may cause the electronic device (e.g., 101) to identify the electric field based on the first RAT, based on identifying an RSSI corresponding to the first antenna during the execution of the voice call.

According to an example embodiment, the instructions, when executed by at least one communication processor, individually and/or collectively (e.g., 120, 212, 214, or 260), may cause the electronic device (e.g., 101) to identify the parameter associated with the antenna sensitivity of the second transmission channel connection, based on identifying an RSRP or an SINR of a signal received through the first antenna based on the second RAT.

According to an example embodiment, the first RAT and the second RAT may be different from each other, the first antenna may be an antenna configured to transmit and receive an RF signal in a frequency band corresponding to the first RAT and an RF signal in a frequency band corresponding to the second RAT, and at least a part of the frequency band corresponding to the second RAT may be the same as the frequency band corresponding to the first RAT.

According to an example embodiment, the instructions, when executed by at least one communication processor, individually and/or collectively (e.g., 120, 212, 214, or 260), may cause the electronic device (e.g., 101) to: set the first antenna to be tuned to the first RAT and the second RAT as at least a part of operating in the first antenna tuning mode, and set the first antenna to be tuned to the first RAT as at least a part of operating in the second antenna tuning mode.

According to an example embodiment, the instructions, when executed by at least one communication processor, individually and/or collectively (e.g., 120, 212, 214, or 260), may cause the electronic device (e.g., 101) to: identify a strength of a signal received through the first antenna based on the first RAT during the execution of the voice call. The instructions, when executed by at least one communication processor, individually and/or collectively (e.g., 120, 212, 214, or 260), may cause the electronic device (e.g., 101) to, based on identifying that the strength of the received signal is less than the first value, control the RF circuit to switch from the first antenna tuning mode to the second antenna tuning mode to prioritize voice call quality.

According to an example embodiment, the instructions, when executed by at least one communication processor, individually and/or collectively (e.g., 120, 212, 214, or 260), may cause the electronic device (e.g., 101) to identify whether the voice call is terminated. The instructions, when executed by at least one communication processor, individually and/or collectively (e.g., 120, 212, 214, or 260), may cause the electronic device (e.g., 101) to, based on identifying that the voice call is terminated, control the RF circuit to switch from the second antenna tuning mode to the first antenna tuning mode.

According to an example embodiment, the first RAT may be associated with LTE, the second RAT may be associated with NR, and the voice call may be based on VOLTE.

According to an example embodiment, the first RAT may be associated with NR, the second RAT may be associated with LTE, and the voice call may be based on VoNR.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or through a third element.

As used in connection with various embodiments of the disclosure, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online through an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

memory storing instructions;

a plurality of antennas including a first antenna configured to transmit and receive radio frequency (RF) signals corresponding to a first radio access technology (RAT) and a second RAT, and a second antenna configured to only receive RF signals corresponding to the first RAT and the second RAT;

an RF circuit coupled to the plurality of antennas; and at least one communication processor, comprising processing circuitry, operatively coupled to the memory and the RF circuit, wherein the instructions, when executed by at least one communication processor, individually and/or collectively, cause the electronic device to:

identify whether dual connectivity including the first RAT and the second RAT is activated;

operate in a first antenna tuning mode for the first antenna that is used for transmission of signals corresponding to the first RAT and the second RAT, based on activation of the dual connectivity;

when a voice call is executed, identify whether the voice call corresponds to the first RAT or the second RAT; and based on identifying that the voice call corresponds to the first RAT:

maintain the first antenna tuning mode for the first antenna, based on an electric field based on the first RAT being equal to or greater than a first value, and change to a second antenna tuning mode, based on the electric field based on the first RAT being less than the first value, during execution of the voice call, and wherein a difference between antenna efficiencies, for transmitting signals of the first antenna, of the first RAT and the second RAT is smaller in the first antenna tuning mode than in the second antenna tuning mode.

2. The electronic device of claim 1, wherein the instructions, when executed by at least one communication processor, individually and/or collectively, cause the electronic device to control the RF circuit to use the first antenna tuning mode, based on identifying that the voice call is not executed.

3. The electronic device of claim 1, wherein the instructions, that when executed by at least one communication processor, individually and/or collectively cause the electronic device to identify the electric field based on the first RAT, based on identifying a received signal strength indicator (RSSI) corresponding to the first antenna during the execution of the voice call.

4. The electronic device of claim 1, wherein the instructions, that when executed by at least one communication processor, individually and/or collectively, cause the electronic device to:

identify a parameter associated with an antenna sensitivity of a transmission channel connection based on the second RAT, based on identifying a reference signal received power (RSRP) or a signal to interference plus noise ratio (SINR) of a signal received through the first antenna based on the second RAT, and wherein, based on the first antenna tuning mode being changed to the second antenna tuning mode, the parameter associated with antenna sensitivity of the transmission channel connection based on the second RAT decreases.

5. The electronic device of claim 1, wherein the first RAT and the second RAT are different from each other, wherein the first antenna is an antenna configured to transmit and receive an RF signal in a frequency band corresponding to the first RAT and an RF signal in a frequency band corresponding to the second RAT, and wherein at least a part of the frequency band corresponding to the second RAT is the same as the frequency band corresponding to the first RAT.

6. The electronic device of claim 1, wherein the instructions, that when executed by at least one communication processor, individually and/or collectively, cause the electronic device to:

set the first antenna to be tuned to the first RAT and the second RAT as at least a part of operating in the first antenna tuning mode, and set the first antenna to be tuned to the first RAT as at least a part of operating in the second antenna tuning mode.

7. The electronic device of claim 1, wherein the instructions, that when executed by at least one communication processor, individually and/or collectively, cause the electronic device to:

identify a strength of a signal received through the first antenna based on the first RAT during the execution of the voice call, and based on identifying that the strength of the received signal is less than the first value, control the RF circuit to switch from the first antenna tuning mode to the second antenna tuning mode to prioritize voice call quality.

8. The electronic device of claim 1, wherein the instructions, that when executed by at least one communication processor, individually and/or collectively, cause the electronic device to:

identify whether the voice call is terminated, and based on identifying that the voice call is terminated, control the RF circuit to switch from the second antenna tuning mode to the first antenna tuning mode.

9. The electronic device of claim 1, wherein the first RAT is associated with long term evolution (LTE), the second RAT is associated with new radio (NR), and the voice call is based on voice over LTE (VoLTE).

10. The electronic device of claim 1, wherein the first RAT is associated with NR, the second RAT is associated with LTE, and the voice call is based on voice over NR (VONR).

11. A method of operating an electronic device, comprising:

identifying whether dual connectivity including a first radio access technology (RAT) and a second RAT is activated using one of a plurality of antennas of the electronic device including a first antenna configured to transmit and receive radio frequency (RF) signals corresponding to the first RAT and the second RAT, and a second antenna configured to only receive RF signals corresponding to the first RAT and the second RAT;

operating in a first antenna tuning mode for the first antenna that is used for transmission of signals corresponding to the first RAT and the second RAT, based on activation of the dual connectivity;

when a voice call is executed, identifying whether the voice call corresponds to the first RAT or the second RAT; and based on identifying that the voice call corresponds to the first RAT:

maintaining the first antenna tuning mode for the first antenna, based on an electric field based on the first RAT being equal to or greater than a first value, changing to a second antenna tuning mode, based on the electric field based on the first RAT being less than the first value, during execution of the voice call, and wherein a difference between antenna efficiencies, for transmitting signals of the first antenna, of the first RAT and the second RAT is smaller in the first antenna tuning mode than in the second antenna tuning mode.

12. The method of claim 11, further comprising controlling a radio frequency (RF) circuit to use the first antenna tuning mode, based on identifying that the voice call is not executed.

13. The method of claim 12, further comprising:

identifying a strength of a signal received through the first antenna based on the first RAT during the execution of the voice call; and based on identifying that the strength of the received signal is less than the first value, controlling the RF circuit to switch from the first antenna tuning mode to the second antenna tuning mode to prioritize voice call quality.

14. The method of claim 12, further comprising:

identifying whether the voice call is terminated; and based on identifying that the voice call is terminated, controlling the RF circuit to switch from the second antenna tuning mode to the first antenna tuning mode.

15. The method of claim 11, further comprising identifying the electric field based on the first RAT, based on identifying a received signal strength indicator (RSSI) corresponding to the first antenna during the execution of the voice call.

16. The method of claim 11, further comprising identifying a parameter associated with an antenna sensitivity of a transmission channel connection based on the second RAT, based on identifying a reference signal received power (RSRP) or a signal to interference plus noise ratio (SINR) of a signal received through the first antenna based on the second RAT, and wherein based on the first antenna tuning mode being changed to the second antenna tuning mode, the parameter associated with antenna sensitivity of the transmission channel connection based on the second RAT decreases.

17. The method of claim 11, wherein the first RAT and the second RAT are different from each other, wherein the first antenna is an antenna configured to transmit and receive an RF signal in a frequency band corresponding to the first RAT and an RF signal in a frequency band corresponding to the second RAT, and wherein at least a part of the frequency band corresponding to the second RAT is the same frequency band as the frequency band corresponding to the first RAT.

18. The method of claim 11, wherein maintaining the first antenna tuning mode comprises setting the first antenna to be tuned to the first RAT and the second RAT, and wherein changing to the second antenna tuning mode comprises setting the first antenna to be tuned to the first RAT.

19. The method of claim 11, wherein the first RAT is associated with long term evolution (LTE), the second RAT is associated with new radio (NR), and the voice call is based on voice over LTE (VoLTE).

20. A non-transitory computer-readable storage medium storing instructions, that when executed by at least one processor of an electronic device, cause the electronic device to perform at least one operation comprising:

identifying whether dual connectivity including a first radio access technology (RAT) and a second RAT is activated using one of a plurality of antennas of the electronic device including a first antenna configured to transmit and receive radio frequency (RF) signals corresponding to the first RAT and the second RAT, and a second antenna configured to only receive RF signals corresponding to the first RAT and the second RAT;

operating in a first antenna tuning mode for the first antenna that is used for transmission of signals corresponding to the first RAT and the second RAT, based on activation of the dual connectivity;

when a voice call is executed, identifying whether the voice call corresponds to the first RAT or the second RAT; and based on identifying that the voice call corresponds to the first RAT:

maintaining the first antenna tuning mode for the first antenna, based on an electric field based on the first RAT being equal to or greater than a first value, changing to a second antenna tuning mode, based on the electric field based on the first RAT being less than the first value, during execution of the voice call, and wherein a difference between antenna efficiencies, for transmitting signals of the first antenna, of the first RAT and the second RAT is smaller in the first antenna tuning mode than in the second antenna tuning mode.

* * * * *